US007027782B2

(12) United States Patent
Moon et al.

(10) Patent No.: US 7,027,782 B2

(45) Date of Patent: Apr. 11, 2006

(54) TRANSCEIVER APPARATUS AND METHOD FOR EFFICIENT HIGH-SPEED DATA RETRANSMISSION AND DECODING IN A CDMA MOBILE COMMUNICATION SYSTEM

(75) Inventors: Yong-Suk Moon, Songnam-shi (KR); Hun-Kee Kim, Seoul (KR); Jae-Seung Yoon, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 574 days.

(21) Appl. No.: 10/273,987

(22) Filed: Oct. 18, 2002

(65) Prior Publication Data

US 2003/0076870 A1 Apr. 24, 2003

(30) Foreign Application Priority Data

Oct. 19, 2001 (KR) ..................... 10-2001-0064742

(51) Int. Cl.

*H04B 1/02* (2006.01)
*H04L 1/18* (2006.01)
*H03M 13/00* (2006.01)
*H04N 7/12* (2006.01)
*H04J 13/00* (2006.01)

(52) U.S. Cl. ........................ 455/102; 455/65; 455/504; 455/3.01; 714/748; 714/758; 714/780; 375/240.27; 375/265; 370/204; 370/479

(58) Field of Classification Search ................ 455/102, 455/65, 504, 3.01, 8, 10, 59, 69, 72, 103, 455/266, 295; 714/746, 748, 751–758, 774, 714/780, 786–810; 375/240.27, 240.24, 375/264, 265, 286, 324, 348, 349; 370/203, 370/204, 208, 464–469, 479, 480, 335, 533, 370/535–544

See application file for complete search history.

(56) References Cited

U.S. PATENT DOCUMENTS 6,101,168 A * 8/2000 Chen et al. ................. 370/228
6,195,534 B1 * 2/2001 Sakoda et al. ................ 455/45

(Continued)

FOREIGN PATENT DOCUMENTS

| | | | |
|---|---|---|---|
| DE | 197 31 261 C2 | 7/2003 |
| GB | 2378368 | 12/2002 |
| WO | WO 02/17550 | 2/2002 |
| WO | WO 02/054659 | 7/2002 |

OTHER PUBLICATIONS

Samsung Electronics, "Simulation results of chase combining with symbol mapping based on bit priority", 3GPP TSG RAN WG1 AdHoc, Jun. 26-28, 2001.*

(Continued)

*Primary Examiner*—Duc M. Nguyen
(74) *Attorney, Agent, or Firm*—Dilworth & Barrese LLP

(57) ABSTRACT

A method for retransmitting coded bits by a transmitter in response to a retransmission request from a receiver in a mobile communication system which separates coded bits output from an encoder into coded bits with higher priority and coded bits with lower priority, and transmits from the transmitter to the receiver a stream of symbols obtained by symbol mapping the coded bits by a specific modulation technique. The method comprises determining orthogonal codes available for retransmission; separating the coded bits with higher priority and the coded bits with lower priority into a plurality of sub-packets with a given size, and selecting a part of the sub-packets or sub-packets to be repeatedly transmitted, depending on the determined number of available orthogonal codes; and transmitting a stream of symbols obtained by symbol-mapping coded bits of the selected sub-packets by the specific modulation technique, with the determined available orthogonal codes.

27 Claims, 19 Drawing Sheets

U.S. PATENT DOCUMENTS

| | | | | |
|---|---|---|---|---|
| 6,490,705 | B1 * | 12/2002 | Boyce | 714/776 |
| 6,529,561 | B1 * | 3/2003 | Sipola | 375/295 |
| 6,697,986 | B1 * | 2/2004 | Kim et al. | 714/751 |
| 6,704,898 | B1 * | 3/2004 | Furuskar et al. | 714/751 |
| 6,769,085 | B1 * | 7/2004 | Von Elbwart et al. | 714/748 |
| 2003/0014709 | A1 * | 1/2003 | Miyoshi et al. | 714/758 |
| 2003/0021240 | A1 | 1/2003 | Moon et al. | |

OTHER PUBLICATIONS

Bossert et al., "Digitale Netze", 1999, Stuttgart, Teubner Verlag, S., pp. 158-159.

Matsuoka et al., "Adaptive Modulation System with Punctured Convolutional Code for High Quality Personal Communication Systems", Universal Personal Communications, 1995 Fourth IEEE Int. Conference, Nov. 6-10, 1995, pp. 22-26.

Bolinth et al., "BRAIN Enhancements for the HIPERLAN/2 Air Interface to Support QoS in Wireless Communications", IST Summit 2000, Galway, Ireland, Oct. 1-4, 2000, pp. 5-10.

Muratore, "UMTS Mobile Communications for the Future", 2001, Chichester, John Wiley, ISBN 0.471-49829-7, pp. 100-101.

Walke, "Mobilfunknetze und ihre Protokolle", vol. 1, 1998, Stuttgart, Teubner Verlag, ISBN 3-519-06430-8, p. 378.

Combined Search and Examination Report dated Feb. 27, 2003, issued in a counterpart application, namely Appln. No. GB 0224288.1.

* cited by examiner

TRANSCEIVER APPARATUS AND METHOD FOR EFFICIENT HIGH-SPEED DATA RETRANSMISSION AND DECODING IN A CDMA MOBILE COMMUNICATION SYSTEM

PRIORITY

This application claims priority to an application entitled "Transceiver Apparatus and Method for Efficient High-Speed Data Retransmission and Decoding in a CDMA Mobile Communication System" filed in the Korean Industrial Property Office on Oct. 19, 2001 and assigned Serial No. 2001-64742, the contents of which are hereby incorporated by reference.

BACKGROUND OF THE INVENTION

1. Field of the Invention

The present invention relates generally to an apparatus and method for measuring a propagation delay in a CDMA (Code Division Multiple Access) mobile communication system, and in particular, to an apparatus and method for measuring a propagation delay in an NB-TDD (Narrow Band Time Division Duplexing) CDMA mobile communication system.

2. Description of the Related Art

Presently, the mobile communication system has evolved from an early voice-based communication system to a high-speed, high-quality radio data packet communication system for providing a data service and a multimedia service. In addition, a 3$^{rd}$ generation mobile communication system, divided into an asynchronous 3GPP (3$^{rd}$ Generation Partnership Project) system and a synchronous 3GPP2 (3$^{rd}$ Generation Partnership Project 2) system, is on the standardization for a high-speed, high quality radio data packet service. For example, standardization on HSDPA (High Speed Downlink Packet Access) is performed by the 3GPP, while standardization on 1×EV-DV (1× Evolution-Data and Voice) is performed by the 3GPP2. Such standardizations are implemented to find out a solution for a high-speed, high-quality radio data packet transmission service of 2 Mbps or over in the 3$^{rd}$ generation mobile communication system. Further, a 4$^{th}$ generation mobile communication system has been proposed, which will provide a high-speed, high-quality multimedia service superior to that of the 3$^{rd}$ generation mobile communication system.

A principal factor that impedes a high-speed, high-quality radio data service lies in the radio channel environment. The radio channel environment frequently changes due to a variation in signal power caused by white nose and fading, shadowing, Doppler effect caused by a movement of and a frequent change in speed of a UE (User Equipment), and interference caused by other users and a multipath signal. Therefore, in order to provide the high-speed radio data packet service, there is a need for an improved technology capable of increasing adaptability to variations in the channel environment in addition to the general technology provided for the existing 2$^{nd}$ or 3$^{rd}$ generation mobile communication system. A high-speed power control method used in the existing system also increases adaptability to variations in the channel environment. However, both the 3GPP and the 3GPP2, carrying out standardization on the high-speed data packet transmission, make reference to AMCS (Adaptive Modulation/Coding Scheme) and HARQ (Hybrid Automatic Repeat Request).

The AMCS is a technique for adaptively changing a modulation technique and a coding rate of a channel encoder according to a variation in the downlink channel environment. Commonly, to detect the downlink channel environment, a UE measures a signal-to-noise ratio (SNR) and transmits the SNR information to a Node B over an uplink. The Node B predicts the downlink channel environment based on the received SNR information, and designates a proper modulation technique and coding rate according to the predicted value. The modulation techniques available for the AMCS include QPSK (Binary Phase Shift Keying), 8PSK (8-ary Phase Shift Keying), 16QAM (16-ary Quadrature Amplitude Modulation), and 64QAM (64-ary Quadrature Amplitude Modulation), and the coding rates available for the AMCS include ½ and ¾. Therefore, an AMCS system applies the high-order modulations (16QAM and 64QAM) and the high coding rate ¾ to the UE located in the vicinity of the Node B, having a good channel environment, and applies the low-order modulations (QPSK and 8PSK) and the low coding rate ½ to the UE located in a cell boundary. In addition, compared to the existing high-speed power control method, the AMCS decreases an interference signal, thereby improving the average system performance.

The HARQ is a link control technique for correcting an error by retransmitting the errored data upon an occurrence of a packet error at an initial transmission. Generally, the HARQ is classified into Chase Combining (CC), Full Incremental Redundancy (FIR), and Partial Incremental Redundancy (PIR).

CC is a technique for transmitting a packet such that the whole packet transmitted at a retransmission is equal to the packet transmitted at the initial transmission. In this technique, a receiver combines the retransmitted packet with the initially transmitted packet that is previously stored in a buffer thereof by a predetermined method. By doing so, it is possible to increase reliability of coded bits input to a decoder, thus resulting in an increase in the overall system performance. Combining the two same packets is similar to repeated coding in terms of the effects, so it is possible to increase a performance gain by about 3 dB on average.

FIR is a technique for transmitting a packet comprised of only redundant bits generated from the channel encoder instead of the same packet, thus improving performance of a decoder in the receiver. That is, the FIR uses the new redundant bits as well as the initially transmitted information during decoding, resulting in a decrease in the coding rate, which thereby improves performance of the decoder. It is well known in coding theory that a performance gain by a low coding rate is higher than a performance gain by repeated coding. Therefore, the FIR is superior to the CC in terms of only the performance gain.

Unlike the FIR, the PIR is a technique for transmitting a combined data packet of the information bits and the new redundant bits at retransmission. Therefore, the PIR can obtain the similar effect as the CC by combining the retransmitted information bits with the initially transmitted information bits during decoding, and also obtain the similar effect as the FIR by performing the decoding using the redundant bits. The PIR has a coding rate slightly higher than that of the FIR, showing intermediate performance between the FIR and the CC. However, the HARQ should be considered in the light of not only the performance but also the system complexity, such as a buffer size and signaling of the receiver. As a result, it is not easy to determine only one of them.

The AMCS and the HARQ are separate techniques for increasing adaptability to the variations in the link environment. Preferably, it is possible to remarkably improve the system performance by combining the two techniques. That is, the transmitter determines a modulation technique and a coding rate proper for a downlink channel condition by the AMCS, and then transmits packet data according to the determined modulation technique and coding rate. Thus, upon failure to decode the data packet transmitted by the transmitter, the receiver sends a retransmission request. Upon receipt of the retransmission request from the receiver, the Node B retransmits the data packet by the HARQ.

FIG. 1 illustrates an existing transmitter for high-speed packet data transmission, wherein it is possible to realize various AMCS techniques and HARQ techniques by controlling a channel encoder 112.

Referring to FIG. 1, the channel encoder 112 is comprised of an encoder and a puncturer (not shown). When input data at a determined data rate is applied to an input terminal of the channel encoder 112, the encoder performs encoding in order to decrease a transmission error rate. Further, the puncturer punctures an output of the encoder according to a coding rate and an HARQ type previously determined by a controller 120, and provides its output to a channel interleaver 114. Since the future mobile communication system needs a powerful channel coding technique in order to reliably transmit high-speed multimedia data, the channel encoder 112 of FIG. 1 is realized by a turbo encoder with a mother coding rate R=⅙ and a puncturer 216, as illustrated in FIG. 2. It is known in the art that channel coding by the turbo encoder shows performance closest to the Shannon limit in terms of a bit error rate (BER) even at a low SNR. The channel coding by the turbo encoder is also adopted for the HSDPA and 1×EV-DV standardization by the 3GPP and the 3GPP2. The output of the turbo encoder can be divided into systematic bits and parity bits. The "systematic bits" refer to actual information bits to be transmitted, while the "parity bits" refer to a signal used to help a receiver correct a possible transmission error. The puncturer 216 selectively punctures the systematic bits or the parity bits output from the encoder, satisfying a determined coding rate.

Referring to FIG. 2, upon receiving one input data, the turbo encoder outputs the intact input data as a systematic bit stream X. The input data is also provided to a first channel encoder 210, and the first channel encoder 210 performs coding on the input data and outputs two different parity bit streams $Y_1$ and $Y_2$. In addition, the input data is also provided to an interleaver 212, and the interleaver 212 interleaves the input data. The intact interleaved input data is transmitted as an interleaved systematic bit stream X'. The interleaved input data is provided to a second channel encoder 214, and the second channel encoder 214 performs coding on the interleaved input data and outputs two different parity bit streams $Z_1$ and $Z_2$. The systematic bit streams X and X' and the parity bit streams $Y_1$, $Y_2$, $Z_1$ and $Z_2$ are provided to the puncturer 216 in a transmission unit of 1, 2, . . . , N. The puncturer 216 determines a puncturing pattern according to a control signal provided from the controller 120 of FIG. 1, and performs puncturing on the systematic bit stream X, the interleaved systematic bit stream X', and the four different parity bit streams $Y_1$, $Y_2$, $Z_1$ and $Z_2$ using the determined puncturing pattern, thus outputting desired systematic bits and parity bits.

As described above, the puncturing pattern used to puncture the coded bits by the puncturer 216 depends upon the coding rate and the HARQ type. That is, using the CC, it is possible to transmit the same packet at each transmission by puncturing the coded bits such that the puncturer 216 has a fixed combination of the systematic bits and the parity bits according to a given coding rate. Using the IR (either FIR or PIR), the puncturer 216 punctures the coded bits in a combination of the systematic bits and the parity bits according to the given coding rate at initial transmission, and punctures the coded symbols in a combination of various parity bits at each retransmission, thus decreasing in the overall coding rate. For example, using the CC with the coding rate ½, the puncturer 216 can continuously output the same bits X and $Y_1$ for one input bit at initial transmission and retransmission, by fixedly using [1 1 0 0 0 0] in the order of the coded bits [X $Y_1$ $Y_2$ X' $Z_1$ $Z_2$] as the puncturing pattern. Using the FIR, the puncturer 216 outputs the coded bits in the order of [$X_1$ $Y_{11}$ $X_2$ $Z_{21}$] at initial transmission and in the order of [$Y_{21}$ $Z_{21}$ $Y_{12}$ $Z_{12}$] at retransmission for two input bits, by using [1 1 0 0 0 0; 1 0 0 0 0 1] and [0 0 1 0 0 1; 0 1 0 0 1 0] as the puncturing patterns at initial transmission and retransmission, respectively. Meanwhile, though not separately illustrated, an R=⅓ turbo encoder adopted by the 3GPP2 can be realized by the first channel encoder 210 and the puncturer 216 of FIG. 2.

A packet data transmission operation by the AMCS system and the HARQ system realized by FIG. 1 will be described herein below. Before transmission of a new packet, the controller 120 of the transmitter determines a proper modulation technique and data rate based on the downlink channel condition information provided from the receiver. The controller 120 provides information on the determined modulation technique and coding rate to the channel encoder 112, a modulator 116 and a frequency spreader 118. A data rate in a physical layer depends upon the determined modulation technique and coding rate. The channel encoder 112 performs bit puncturing according to a given puncturing pattern after performing the encoding based on a signal from the controller 120, thereby finally outputting coded bits. The coded bits output from the channel encoder 112 are provided to the channel interleaver 114, in which they are subject to interleaving. Interleaving is a technique for preventing a burst error by randomizing the input bits to disperse data symbols into several places instead of concentrating the data symbols in the same place in a fading environment. For ease of explanation, the size of the channel interleaver 114 is assumed to be larger than or equal to the total number of the coded bits. The modulator 116 symbol-maps the interleaved coded bits according to the modulation technique previously determined by the controller 120 and a given symbol mapping technique. If the modulation technique is represented by M, the number of coded bits constituting one symbol becomes $\log_2 M$. The frequency spreader 118 assigns multiple Walsh codes for the modulated symbols provided from the modulator 116, for high-speed data transmission corresponding to the data rate determined by the controller 120, and spreads the modulated symbols with the assigned Walsh codes. When a fixed chip rate and a fixed spreading factor (SF) are used in the high-speed packet transmission system, a rate of symbols transmitted with one Walsh code is constant. Therefore, in order to use the determined data rate, it is necessary to use multiple Walsh codes.

For example, when a system using a chip rate of 3.84 Mcps and an SF of 16 chips/symbol uses 16QAM and a channel coding rate ¾, a data rate that can be provided with one Walsh code becomes 1.08 Mbps. Therefore, when 10 Walsh codes are used, it is possible to transmit data at a data rate of a maximum of 10.8 Mbps.

It is assumed in the transmitter of the high-speed packet transmission system of FIG. 1 that the modulation technique and coding rate determined by the controller 120 at initial transmission of a data packet according to a channel condition is used even at retransmission. However, as described above, the high-speed data transmission channel is subject to a change in its channel condition even in a retransmission period by the HARQ due to the change in the number of UEs in a cell and the Doppler shift. Therefore, maintaining the modulation technique and the coding rate used at the initial transmission contributes to a reduction in the system performance.

For this reason, the ongoing HSDPA and 1×EV-DV standardizations consider an improved method for changing the modulation technique and the coding rate even in the retransmission period. For example, in a system using the CC as the HARQ, when the HARQ type is changed, a transmitter retransmits a part or the whole of the initially transmitted data packet, and a receiver partially combines the partially retransmitted packet with the whole of the initially transmitted packet, resulting in a reduction in the entire bit error rate of a decoder. Structures of the transmitter and the receiver are illustrated in FIGS. 3 and 4, respectively.

As illustrated in FIG. 3, the transmitter for the improved method further includes a partial Chase encoder 316 in addition to the transmitter of FIG. 1. Referring to FIG. 3, coded bits generated by encoding input data according to the given modulation technique and coding rate by a channel encoder 312 are provided to the partial chase encoder 316 after being interleaved by an interleaver 314. The partial Chase encoder 316 controls an amount of data (or the number of data bits) to be transmitted at retransmission among the interleaved coded bits based on information on a modulation technique used at initial transmission, a current modulation technique and the number of Walsh codes to be used, provided from the controller 322. A modulator 318 performs symbol-mapping on the coded bits output from the partial Chase encoder 316 according to a given modulation technique, and provides its output to a spreader 320. The spreader 320 assigns a needed number of Walsh codes among the Walsh codes available for the modulated symbols provided from the modulator 318, and frequency-spreads the modulated symbols with the assigned Walsh codes. Here, the channel coding rate at the retransmission is identical to the channel coding rate at the initial transmission, and the number of the Walsh codes to be used at the retransmission may be different from the number of the Walsh codes used at the initial transmission.

FIG. 4 illustrates a structure of a receiver corresponding to the transmitter illustrated in FIG. 3. The receiver further includes a partial Chase combiner 416 corresponding to the partial Chase encoder 316 of FIG. 3, in addition to the existing receiver. A despreader 412 despreads the modulated symbols transmitted from the transmitter with the same Walsh codes as used by the transmitter, and provides its output to a demodulator 414. The demodulator 414 demodulates the modulated symbols from the despreader 412 by a demodulation technique corresponding to the modulation technique used by the transmitter, and outputs a corresponding LLR (Log Likelihood Ratio) value to the partial Chase combiner 416. The LLR value is a value determined by performing soft decision on the demodulated coded bits. The partial Chase combiner 416 substitutes for the soft combiner in the existing receiver. This is because when the modulation used at the initial transmission is different from the modulation used at the retransmission, the packet combining is partially performed since an amount of the retransmitted data is different from an amount of the initially transmitted data. If the high-order modulation is used at retransmission, the partial Chase combiner 416 performs full combining on the entire packet. However, if the low-order modulation is used at retransmission, the partial Chase combiner 416 performs partial combining. The partial Chase combiner 416 provides the partially or fully combined coded bits to a deinterleaver 418. The deinterleaver 418 deinterleaves the coded bits from the partial Chase combiner 416 and provides the deinterleaved data to a channel decoder 420. The channel decoder 420 decodes the deinterleaved coded bits according to a given decoding technique. Though not illustrated in FIG. 4, the receiver performs CRC (Cyclic Redundancy Check) checking on the decoded information bits, and transmits an ACK (Acknowledge) or a NACK (Negative Acknowledge) signal to a Node B according to the CRC checking results, thereby requesting transmission of new data or retransmission of the errored packet.

FIG. 5A illustrates a change in a size of the packet encoded by the partial Chase encoder 316 illustrated in FIG. 3 according to a change in the modulation technique at initial transmission and retransmission and a change in number of available codes. It is assumed herein that a turbo code rate is ½ and the number of available codes used at retransmission is reduced to 3, which is smaller than half of the 8 available codes used at initial transmission. If a modulation order used at retransmission is higher than a modulation order used at initial transmission, only a part of the initially transmitted packet is retransmitted. For example, as illustrated in (a-2) of FIG. 5A, if a modulation technique is changed from $M_i$=QPSK at initial transmission to $M_r$=16QAM at retransmission, the number of coded bits needed per code during retransmission becomes twice the number of coded bits needed per code during initial transmission. However, since the number of codes assigned during retransmission is smaller than half of the number of codes assigned at initial transmission, only a part of the initially transmitted packet is retransmitted. In this case, among the data blocks transmitted through a total of 8 codes during initial transmission, only the data blocks A, B, C, D, E, and F corresponding to the first 6 codes are transmitted through 3 available codes during retransmission. In addition, as illustrated in (a-1) of FIG. 5A, if a modulation technique used at retransmission is identical to a modulation technique used at initial transmission ($M_i$=$M_r$), a size of data that can be transmitted is reduced in proportion to the reduced number of codes. Therefore, among the data blocks transmitted through the 8 codes during initial transmission, only the data blocks A, B, and C corresponding to the first 3 codes are transmitted through 3 available codes during retransmission.

FIG. 5B illustrates how the partial Chase combiner 416 combines a data packet transmitted through the partial Chase encoder 316 during initial transmission and retransmission. For example, as illustrated in (b-2) of FIG. 5B, if a modulation technique is changed from $M_i$=QPSK to $M_r$=16QAM, data blocks that can be retransmitted due to a change in number of codes are A, B, C, D, E and F among the initially transmitted data blocks. Therefore, the data blocks A, B, C, D, E, and F are partially soft-combined with the initially transmitted data blocks A to H, thereby increasing the reliability of a received signal. In addition, as illustrated in (b-1) of FIG. 5B, if a modulation technique used at retransmission is identical to a modulation technique used at initial transmission ($M_i$=$M_r$), a retransmitted data packet corresponds to the initially transmitted data blocks A to C. Therefore, the partial Chase combiner 416 performs partial Chase combining on the initially transmitted packet and the retransmitted packet. Here, it should be noted that although a size of the combined data block is smaller as compared with the case of (b-2), since the low-order modulation is used, reliability of combined retransmission data is relatively high. Therefore, performance is not always linearly determined according to the size of the combined partial packet.

In FIGS. 5A and 5B, a case where the number of codes is increased during retransmission is not taken into consideration because when the modulation order used at retransmission is higher than or equal to the modulation order used at initial transmission, if the number of codes assigned for retransmission is larger than the number of codes assigned for initial transmission, the entire packet can be combined. In this case, it is preferable to use the same modulation technique instead of changing the modulation technique to a high-order modulation technique.

FIGS. 6A and 6B illustrate operations of the partial Chase encoder 316 and the partial Chase combiner 416, respectively, when the number of codes used at retransmission is increased to 6, compared with the 4 codes used at initial transmission.

Referring to (a-2) of FIG. 6A, if a modulation technique is changed from $M_i$=16QAM at initial transmission to $M_r$=QPSK at retransmission, data blocks transmitted through 2 codes during retransmission correspond to the data blocks transmitted through one code during initial transmission. Therefore, among the initially data blocks, data blocks A, B, and C corresponding to first 3 codes are transmitted through the assigned 6 codes during retransmission. The data blocks A, B, and C are finally partially soft-combined with the initially transmitted data blocks at the receiver, as illustrated (b-2) of FIG. 6A.

Referring to (a-1) of FIG. 6A, if a modulation technique at retransmission is identical to a modulation technique at initial transmission ($M_i$=$M_r$), data blocks A, B, C, D, A, and B, which amount to 1.5 times the initially transmitted data blocks, can be transmitted during retransmission. Therefore, as illustrated in (b-1) of FIG. 6B, by one transmission, the receiver can obtain two-soft combining effect for the data blocks A and B, and one-soft combining effect for the data blocks C and D. That is, an effect of simultaneously performing full combining several times can be obtained, thus increasing the system performance. However, as described above, the size of the combined partial packet is not always proportional to the performance. This is because a process of combining the entire packet using the same modulation technique in a bad channel condition and a process of combining the partial packet using the low-order modulation technique have advantages and disadvantages. In FIGS. 6A and 6B, a case where a modulation order used at retransmission is higher than a modulation order used at initial transmission is not taken into consideration because the number of codes is increased due to the worsened channel condition during retransmission, the transmitter allowed to use the same modulation technique as used at initial transmission, as described in conjunction with (a-1) of FIG. 6A.

In a high-speed packet transmission system in which the number of codes available for retransmission is variable and the CC is used for the HARQ, if the partial Chase encoder 316 and the partial Chase combiner 416 illustrated in FIGS. 3 and 4 are used, it is possible to increase the system performance by more actively coping with a change in the channel environment by changing the modulation technique even at retransmission. However, as illustrated in (b-2) of FIG. 5B and (b-2) of FIG. 6B, the partial combining on the entire transmission packet contributes to a decrease in the bit error rate, but fails to satisfactorily contribute to a reduction in the frame error rate. This is because the output of the channel interleaver 314 of FIG. 3 is a random combination of the systematic bits and the parity bits from the channel encoder 312. That is, if the packet size at retransmission is smaller than the packet size at initial transmission, the combining cannot be performed on all of the information bits, so the combining effect occurs randomly in a bit unit. In particular, there is a demand for a new method for remarkably reducing a frame error rate by compensating all of the information bits using the feature that the turbo code should be transmitted in combination of the systematic bits and the parity bits even when the system using the CC is required to transmit a smaller packet at retransmission than at initial transmission.

SUMMARY OF THE INVENTION

It is, therefore, an object of the present invention to provide a data transmission/reception apparatus and method for improving performance of a radio communication system.

It is another object of the present invention to provide a transceiver apparatus and method for receiving bits at a higher reception probability in a receiver in a radio communication system.

It is further another object of the present invention to provide an apparatus and method for efficiently transmitting and receiving high-speed data, using channel interleavers separately applied to systematic bits and parity bits output from a channel encoder, and deinterleavers in a receiver, associated with the channel interleavers.

It is yet another object of the present invention to provide an apparatus and method for efficiently transmitting and receiving high-speed data by associating channel interleavers separately applied to systematic bits and parity bits output from a channel encoder, with the CC, one of the HARQ types.

It is still another object of the present invention to provide an apparatus and method for obtaining a system performance gain by adaptively changing only a modulation technique while maintaining a coding rate used at initial transmission in a channel environment where a number of codes available for retransmission is variable, in a transmitter for a high-speed radio communication system supporting AMCS (Adaptive Modulation/Coding Scheme).

It is still another object of the present invention to provide a control apparatus and method for obtaining a system performance gain by selectively retransmitting data packets each divided systematic bits and parity bits according to a modulation technique required in a channel environment where the number of available codes is variable, in a transmitter for a high-speed radio communication system supporting AMCS.

It is still another object of the present invention to provide a control apparatus and method for obtaining a performance gain by selectively soft-combining, at a receiver, an initially transmitted data packet with a data packet selectively retransmitted by a modulation technique required in a channel environment where the number of available codes is variable, in a transmitter for a high-speed radio communication system.

In accordance with a first aspect of the present invention, the present invention provides a method for retransmitting coded bits by a transmitter in response to a retransmission request from a receiver in a mobile communication system, which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code. The method comprises determining the number of orthogonal codes available for retransmission and determining as many available orthogonal codes as the determined number of available orthogonal codes; separating the coded bits with higher priority and the coded bits with lower priority into a plurality of sub-packets with a given size, and selecting a part of the sub-packets or sub-packets to be repeatedly transmitted, depending on the determined number of available orthogonal codes; and transmitting a stream of symbols obtained by symbol-mapping coded bits of the selected sub-packets by the specific modulation technique, with the determined available orthogonal codes.

In accordance with a second aspect of the present invention, the present invention provides an apparatus for retransmitting coded bits by a transmitter in response to a retransmission request from a receiver in a mobile communication system, which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code. The apparatus comprises a controller for determining orthogonal codes available for retransmission; a selector for separating the coded bits with higher priority and the coded bits with lower priority into a plurality of sub-packets with a given size, and selecting a part of the sub-packets or sub-packets to be repeatedly transmitted, depending on the determined number of available orthogonal codes; a modulator for generating a stream of symbols by symbol mapping coded bits of the selected sub-packets by the specific modulation technique; and a frequency spreader for transmitting the stream of symbols using the determined available orthogonal codes.

In accordance with a third aspect of the present invention, the present invention provides a method for receiving by a receiver data retransmitted from a transmitter in a mobile communication system, which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code. The method comprises determining orthogonal codes available for retransmission; despreading the received data with the determined available orthogonal codes and outputting a stream of modulated symbols; demodulating the stream of modulated symbols by a demodulation technique corresponding to the specific modulation technique, and outputting coded bits; separating the coded bits into the coded bits with higher priority and the coded bits with lower priority, and combining the separated coded bits with a part of previously received coded bits or all the previously received coded bits; and separately deinterleaving the combined coded bits with higher priority and the combined coded bits with lower priority, and channel-decoding the deinterleaved coded bits.

In accordance with a fourth aspect of the present invention, the present invention provides an apparatus for receiving by a receiver data retransmitted from a transmitter in a mobile communication system, which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code. The apparatus comprises a despreader for despreading the received data with as many available orthogonal codes as the number of available orthogonal codes used during retransmission, and outputting a stream of modulated symbols; a demodulator for demodulating the stream of modulated symbols by a demodulation technique corresponding to the specific modulation technique; a selective packet combiner for separating the coded bits into the coded bits with higher priority and the coded bits with lower priority, and combining the separated coded bits with a part of previously received coded bits or all the previously received coded bits; a deinterleaver for separately deinterleaving the combined coded bits with higher priority and the combined coded bits with lower priority; and a channel decoder for channel-decoding the deinterleaved coded bits with higher priority and the deinterleaved coded bits with lower priority.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention will be described with reference to different embodiments where a channel encoder supports a coding rate of ½ and ¾, a modulator supports a modulation technique of QPSK, 8PSK, 16QAM and 64QAM, and the modulation technique is changed in a channel environment where the number of codes available for retransmission is variable. In addition, the present invention will be described with reference to only the case where CC (Chase Combining), one of the HARQ types, is used.

Figure 7:
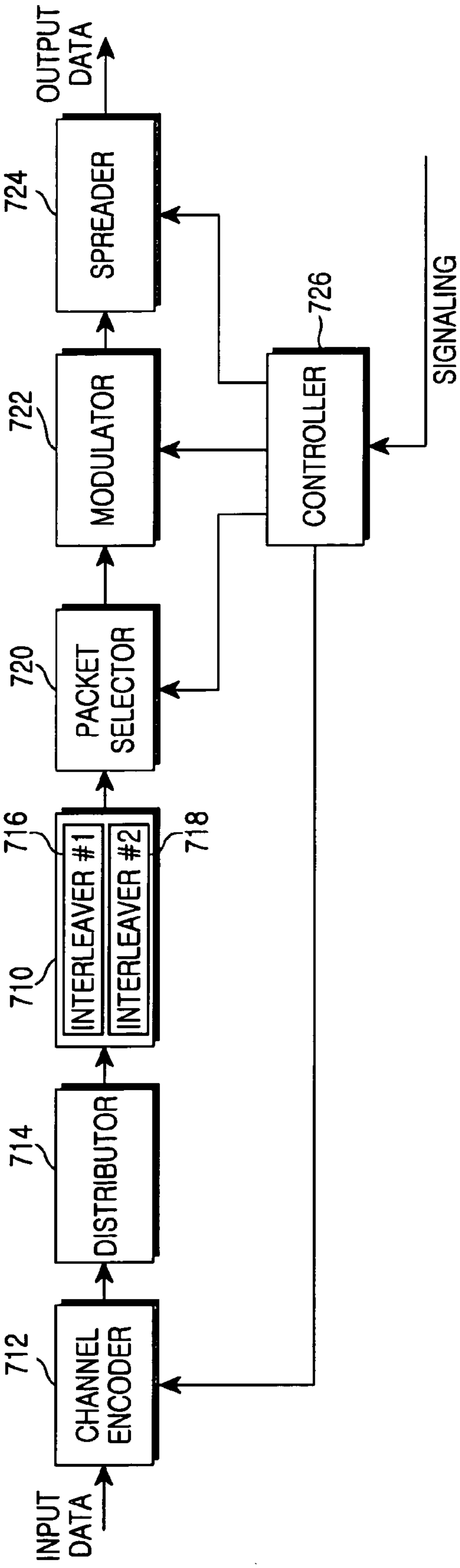
FIG. 7 illustrates a structure of a transmitter in a CDMA mobile communication system according to an embodiment of the present invention.

FIG. 7 illustrates a structure of a transmitter in a CDMA mobile communication system according to an embodiment of the present invention. Referring to FIG. 7, a controller (for AMCS) 726 controls an overall operation of the transmitter according to an embodiment of the present invention. In particular, the controller 726 determines a modulation technique, a coding rate, and the number of available codes for data transmission based on signaling information provided from an upper layer (not shown). The signaling information is determined by a confirmation signal (ACK/NACK) for the transmitted data or information on the current downlink channel condition, transmitted from a receiver. The modulation technique, the coding rate, and the number of available codes are determined by the upper layer and provided to the controller 726 by the signaling information. The controller 726 determines the number of orthogonal codes (e.g., Walsh codes) required by a frequency spreader 724 based on the determined modulation technique and the determined number of available codes. The transmitter may change the modulation technique and the number of orthogonal codes upon receipt of a retransmission request NACK for the transmitted data from the receiver. A typical method for determining the modulation technique is to determine the modulation technique according to a condition of the downlink traffic channel transmitting data, at initial transmission and each retransmission. The condition of the downlink traffic channel can be determined depending upon the information on the current downlink traffic channel transmitted from the receiver. Therefore, the controller 726 can determine different modulation techniques at initial transmission and each retransmission. The initial transmission is performed upon receipt of an ACK signal from the receiver, and the retransmission is performed upon receipt of a NACK signal from the receiver. The determined modulation technique information is provided to a packet selector 720, a modulator 722 and the frequency spreader 724. Further, the controller 726 provides the determined coding rate information to a channel encoder 712.

The channel encoder 712 encodes input data with a given code at the coding rate provided from the controller 726, and outputs coded bits. The input data includes CRC so that the receiver can check whether an error has occurred in the received data. The "given code" refers to a code used to output coded bits comprised of bits for encoding the input data before transmission and error control bits for the bits. For example, when a turbo code is used as the given code, the transmission bits become systematic bits and the error control bits become parity bits. Meanwhile, the channel encoder 712 is divided into an encoder and a puncturer. The encoder encodes the input data at a given coding rate, and the puncturer determines a ratio of the systematic bits to the parity bits output from the encoder according to the coding rate. For example, if the given coding rate is a symmetric coding rate ½, the channel encoder 712 receives one input bit and outputs one systematic bit and one parity bit. However, if the given coding rate is an asymmetric coding rate ¾, the channel encoder 712 receives three input bits and outputs three systematic bits and one parity bit. Here, a description of the present invention will be made separately for the coding rates ½ and ¾.

A distributor 714 distributes the systematic bits and the parity bits received from the channel encoder 712 to a plurality of interleavers. When the interleavers include two interleavers 716 and 718, the distributor 714 distributes the systematic bits and the parity bits into two bit groups. For example, the distributor 714 distributes the systematic bits from the channel encoder 712 to the first interleaver 716, and the remaining parity bits to the second interleaver 718. In this case, if the symmetric coding rate ½ is used, the number of symmetric bits output from the channel encoder 712 is equal to the number of parity bits output from the channel encoder 712, so the first interleaver 716 and the second interleaver 718 are filled with the same number of coded bits. However, if the asymmetric coding rate ¾ is used, the number of symmetric bits filled in the first interleaver 716 is 3 times larger than the number of parity bits filled in the second interleaver 718.

The first interleaver 716 interleaves the systematic bits from the distributor 714, and the second interleaver 718 interleaves the parity bits from the distributor 714. In FIG. 7, the first interleaver 716 and the second interleaver 718 are separated by hardware. However, the first interleaver 716 and the second interleaver 718 can be simply logically separated. The logical separation means dividing one memory into a memory area for storing the systematic bits and another memory area for storing the parity bits.

The packet selector 720 receives information on a modulation technique from the controller 726, and determines an amount of data that can be normally transmitted by the modulation technique. After determining an amount of the transmittable data, the packet selector 720 selects one of given packets each divided into systematic bits and parity bits provided from the first interleaver 716 and the second interleaver 718. The given packets can be divided into a systematic packet comprised of only the systematic bits and a parity packet comprised of only the parity bits. Commonly, the transmitter transmits data in a TTI (Time To Interleaving) unit. The TTI is a time period from a point where transmission of coded bits starts to a point where transmission of the coded bits ends. The TTI has a slot unit. For example, the TTI is comprised of 3 slots. Therefore, the given packets are the coded bits transmitted for the TTI.

Meanwhile, as described above, the packet selector 720 can be provided with information on the different modulation techniques and the number of available codes from the controller 726 at initial transmission and each retransmission. Therefore, the packet selector 720 determines an amount of retransmission data based on the information on the modulation technique used for initial transmission, the current modulation techniques and the number of available codes, and then properly selects the transmission packet according to the determined data amount. That is, the packet selector 720 selects the output of the first interleaver 716 or the output of the second interleaver 718 according to the determined data amount. For example, at initial transmission, the packet selector 720 selects the systematic bits and the parity bits in the TTI unit. However, if the modulation technique is changed at retransmission or the number of available codes is changed, the packet selector 720 cannot transmit the intact packet transmitted at the initial transmission. Therefore, the packet selector 720 separates the systematic packet and the parity packet initially transmitted in the TTI unit into a plurality of sub-packets with a given size, and selects the sub-packets according to the determined data amount. When the determined data amount is smaller than the initially transmitted data amount, the packet selector 720 selects a part of the sub-packets. However, when the determined data amount is larger than the initially transmitted data amount, the packet selector 720 repeatedly selects the sub-packets and a part of the sub-packets. Therefore, the sub-packets should have a size determined such that it is possible to freely vary an amount of the transmission data according to the variable modulation technique. In addition, the packet selector 720 should consider both priority of the coded bits to be transmitted and the number of retransmissions in selecting the packets according to the data amount. That is, when transmitting a part of the initially transmitted systematic packet and parity packet, the packet selector 720 first selects the systematic packet, actual information bits. In addition, when repeatedly transmitting a part of the initially transmitted systematic packet and parity packet, the packet selector 720 first selects the systematic packet. However, in order to improve the system performance, it is preferable to transmit other non-transmitted packets instead of transmitting only the systematic packet at each retransmission. To this end, the packet selector 720 may use the number of retransmissions.

For example, if the number of retransmissions is an odd number, the packet selector 720 first transmits the systematic packet, and if the number of retransmissions is an even number, the packet selector 720 first transmits the parity packet. Therefore, at retransmission, the packet selector 720 outputs only the systematic bits, only the parity bits, or a combination of the systematic bits and the parity bits. FIGS. 9A and 9B, FIGS. 10A and 10B, FIGS. 11A and 11B, and FIGS. 12A and 12B illustrate patterns for selecting the coded bits according to various modulation techniques and the number of available codes by the packet selector 720. A detailed description of the patterns will be made later.

The modulator 722 modulates the coded bits of the packets selected by the packet selector 720 according to the modulation technique provided from the controller 726. Modulation on the coded bits is performed by mapping the coded bits to transmission symbols by a given symbol mapping technique. A mapping pattern of the coded bits is determined according to the modulation technique information provided from the controller 726. For example, if the modulation technique provided from the controller 726 is 16QAM, the symbols have a symbol pattern {H,H,L,L}, so that 4 coded bits are mapped to 4 bit positions of the symbol pattern. If the modulation technique provided from the controller 726 is 64QAM, the symbols have a symbol pattern {H,H,M,M,L,L}, so that 6 coded bits are mapped to 6 bit positions of the symbol pattern. In the above symbol patterns, H represents a bit position having higher reliability, M represents a bit position having medium reliability, and L represents a bit position having lower reliability. Meanwhile, if the modulation technique provided from the controller 726 is 8PSK, the symbols have a symbol pattern comprised of 3 bit positions, and if the modulation technique is QPSK, the symbols have a symbol pattern comprised of 2 bit positions.

The frequency spreader 724 frequency-spreads the symbols output from the modulator 722 with the orthogonal codes (e.g., Walsh codes) assigned by the controller 726, and transmits the spread symbols to the receiver. That is, for frequency-spreading, the frequency spreader 724 demultiplexes a symbol stream output from the modulator 722 according to the number of assigned orthogonal codes, and applies the assigned orthogonal codes to the demultiplexed symbols. The number of the orthogonal codes is determined by the controller 726, and assigned to the symbols output from the modulator 722.

Figure 8:
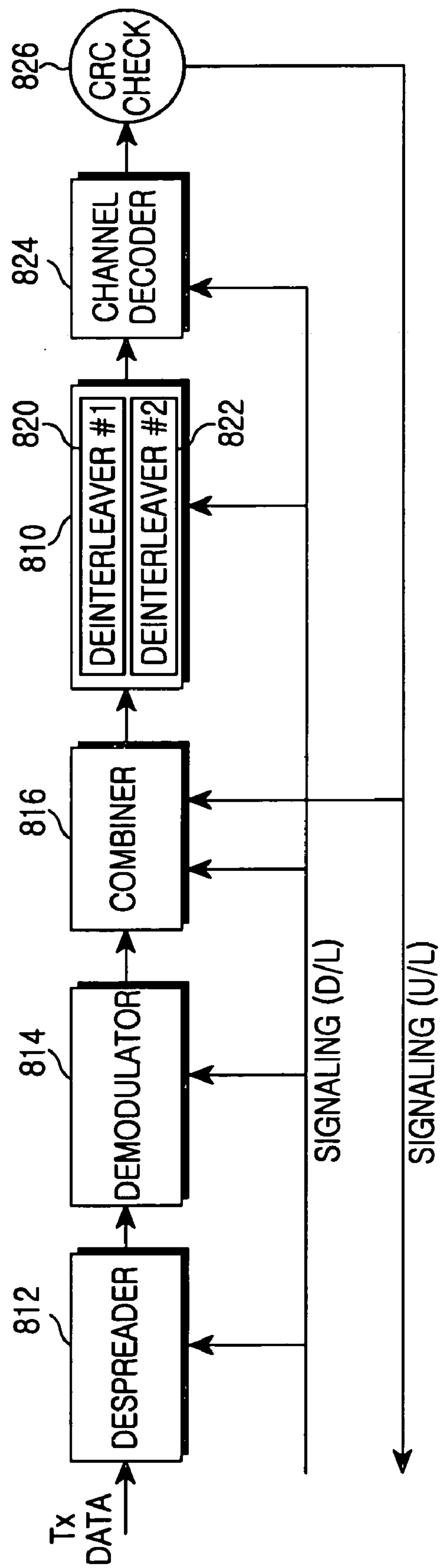
FIG. 8 illustrates a structure of a receiver in a CDMA mobile communication system according to an embodiment of the present invention.

FIG. 8 illustrates a structure of a receiver, corresponding to the transmitter illustrated in FIG. 7, according to an embodiment of the present invention. Referring to FIG. 8, the receiver receives, over a downlink traffic channel, data symbols transmitted by the transmitter after being frequency-spread by multiple orthogonal codes. A despreader 812 despreads the received data symbols with the orthogonal codes used by the transmitter, multiplexes the despread modulated symbols, and serially outputs the multiplexed symbols.

A demodulator 814 demodulates the modulated symbols output from the despreader 812 by a demodulation technique corresponding to the modulation technique used by the transmitter, and outputs coded bits. The coded bits correspond to the output of the packet selector 720 in the transmitter, and have an LLR value due to the noises on the radio channel. The LLR value is an obscure value that is not defined as "1" nor "0." The demodulator 814 may have a buffer with a specific size to perform symbol combining if a modulation technique used at initial transmission is identical to a modulation technique used at retransmission, thereby resulting in an improvement in reliability of the LLR value. In addition, if two different modulation techniques are used in the HARQ process, the symbol combining is performed on only the transmission packets modulated by the same modulation technique.

A selective packet combiner 816 receives the LLR values of the coded bits output from the demodulator 814, determines a characteristic of input data using information on the modulation technique at initial transmission, the current modulation technique and the number of codes used at initial transmission and retransmission based on the received LLR values, and then performs packet combining in a bit level. The characteristic of the input data, or a structure of the input data, may include a systematic packet comprised of systematic bits, a parity packet comprised of parity bits, or a combined packet comprised of a combination of the systematic bits and the parity bits. The selective packet combiner 816 is comprised of first a buffer for an S sub-packet comprised of systematic bits and a second buffer for a P sub-packet comprised of parity bits. The combining is separately performed on the same S or P sub-packet. For example, if only the S packet was transmitted during retransmission, the retransmitted S sub-packet is combined with data that was stored in the S sub-packet buffer during initial transmission. At this point, the P sub-packet is not subject to combining, and the data transmitted at initial transmission is provided to a deinterleaving section 810.

The deinterleaving section 810, corresponding to an interleaving section 710 in the transmitter illustrated in FIG. 7, is comprised of two independent deinterleavers 820 and 822. The first deinterleaver 820 deinterleaves the systematic bits constituting the combined systematic packet provided from the selective packet combiner 816, and the second deinterleaver 822 deinterleaves the parity bits constituting the combined parity packet provided from the selective packet combiner 816. Here, a deinterleaving pattern used by the deinterleaving section 810 has a reverse order of the interleaving pattern used by the interleaving section 710 illustrated in FIG. 7, so the deinterleaving section 810 should previously recognize the interleaving pattern.

A channel decoder 824 is divided into a decoder and a CRC checker 826 according to the function. The decoder receives the coded bits comprised of the systematic bits and the parity bits from the deinterleaving section 810, decodes the received coded bits according to a given decoding technique, and outputs desired received bits. For the given decoding technique, the decoder uses a technique of receiving systematic bits and parity bits, and then decoding the systematic bits, and the decoding technique is determined according to the coding technique of the transmitter. The received bits output from the decoder include CRC bits added during data transmission by the transmitter. Therefore, the CRC checker 826 checks the received bits using the CRC bits included in the received bits thus to determine whether an error has occurred. If it is determined that no error has occurred in the received bits, the CRC checker 826 outputs the received bits and transmits an ACK signal as a response signal confirming receipt of the received bits. However, if it is determined that an error has occurred in the received bits, the CRC checker 826 transmits a NACK signal requesting retransmission of the received bits as a response signal. The first and second buffers in the combiner 816 are initialized or maintain the current state according to whether the transmitted confirmation signal is the ACK signal or the NACK signal. That is, when the ACK signal is transmitted, the first and second buffers are initialized to receive new packet. However, when the NACK signal is transmitted, the first and second buffers maintain the current state to prepare for combining with the retransmitted packet.

Meanwhile, the receiver should previously recognize information on the coding rate, the modulation technique, the orthogonal codes, and the number of orthogonal codes, used by the transmitter illustrated in FIG. 7, and the number of retransmissions, for demodulation and decoding. That is, the above information should be previously provided to the despreader 812, the demodulator 814, the selective packet combiner 816, and the decoder 824 so that the receiver can perform a corresponding operation of the transmitter. Therefore, the above information is provided from the transmitter to the receiver over a downlink control channel.

First, before a detailed description of the present invention, preferred embodiments of the present invention will be described in brief.

A first embodiment of the present invention provides a transceiver for supporting different modulation techniques at initial transmission and retransmission if the number of codes available for retransmission is reduced in a CDMA mobile communication system supporting a coding rate ½ and the CC, one of the HARQ types. The transceiver supports QPSK modulation at initial transmission, and supports QPSK modulation and 16QAM modulation at retransmission. Specifically, during retransmission, the first embodiment selects transmission data according to a changed number of available orthogonal codes and a changed modulation technique, and efficiently combines the selected data.

A second embodiment of the present invention provides a transceiver for supporting different modulation techniques at initial transmission and retransmission if the number of codes available for retransmission is reduced in a CDMA mobile communication system supporting a coding rate ¾ and the CC. The transceiver supports QPSK modulation at initial transmission, and supports QPSK modulation and 16QAM modulation at retransmission. Specifically, during retransmission, the second embodiment selects transmission data according to the changed number of available orthogonal codes and the changed modulation technique, and efficiently combines the selected data.

A third embodiment of the present invention provides a transceiver for supporting different modulation techniques at initial transmission and retransmission if the number of codes available for retransmission is increased in a CDMA mobile communication system supporting a coding rate ½ and the CC. The transceiver supports QPSK modulation at initial transmission, and supports QPSK modulation and 16QAM modulation at retransmission. Specifically, during retransmission, the third embodiment selects transmission data according to the changed number of available orthogonal codes and the changed modulation technique, and efficiently combines the selected data.

A fourth embodiment of the present invention provides a transceiver for supporting different modulation techniques at initial transmission and retransmission if the number of codes available for retransmission is increased in a CDMA mobile communication system supporting a coding rate ¾ and the CC. The transceiver supports QPSK modulation at initial transmission, and supports QPSK modulation and 16QAM modulation at retransmission. Specifically, during retransmission, the fourth embodiment selects transmission data according to a changed number of available orthogonal codes and a changed modulation technique, and efficiently combines the selected data.

Now, the preferred embodiments of the present invention will be described in detail with reference to the accompanying drawings.

1. First Embodiment (Coding Rate is ½, and the Number of Orthogonal Codes Available for Retransmission is Decreased)

The first embodiment of the present invention will be described herein below with reference to the accompanying drawings. In the first embodiment, a coding rate is ½ and the CC is used as the HARQ. In addition, at initial transmission, data is transmitted by QPSK modulation using 8 available orthogonal codes, and at retransmission, data is retransmitted by QPSK modulation or another modulation technique using 3 available orthogonal codes, decreased by 5 orthogonal codes was compared with the initial transmission.

First, an operation of transmitting data will be described with reference to the transmitter of FIG. 7. The CRC-added input data is applied to the channel encoder 712, in which the input data is encoded with a given code at a coding rate ½ provided from the controller 726 and the coded bits are serially output. The coded bits are divided into systematic bits (S bits) corresponding to actual transmission data and parity bits (P bits) for error control over the input data. Since the coding rate used is a symmetric coding rate ½, the channel encoder 712 outputs the S bits and the P bits in the same ratio. The coded bits comprised of the S bits and the P bits are subject to puncturing according to a given puncturing pattern by the puncturer included in the channel encoder 712. Using the CC-type HARQ, the same puncturing pattern is used at initial transmission and retransmission, so the channel encoder 712 outputs the same data bit stream at each transmission. Commonly, when a transport channel is subject to multiplexing or the coded bits output from the channel encoder 712 are not identical in number to the symbols transmitted over the air, rate matching must be performed on the coded bits through repetition and puncturing. In the present invention, the channel encoder 712 performs the rate matching.

The coded bits serially output from the channel encoder 712 are separated into S bits and P bits through the distributor 714, and then distributed to corresponding interleavers. For example, when the interleaver 710 includes two interleavers 716 and 718, the distributor 714 distributes the S bits to the first interleaver 716 and the P bits to the second interleaver 718. The distributed S bits and P bits from the distributor 714 are interleaved by the first interleaver 716 and the second interleaver 718. The interleaving pattern of the first interleaver 716 can be either identical to or different from the interleaving pattern of the second interleaver 718. The receiver should also recognize the determined interleaving pattern.

The interleaved S bits and P bits provided from the first interleaver 716 and the second interleaver 718 are provided to the packet selector 720. The packet selector 720 selects a transmission packet based on information on the modulation technique used at initial transmission, the current modulation technique, and the number of retransmissions, and provides the selected packet to the modulator 722. The modulator 722 modulates the interleaved coded bits by a symbol mapping technique corresponding to a predetermined modulation technique, and provides its output to the frequency spreader 724. The frequency spreader 724 demultiplexes the modulated symbols from the modulator 722 according to the number of available orthogonal codes, spreads the demultiplexed symbols using the corresponding orthogonal codes, and transmits the spread symbols to the receiver.

Next, how a transmission packet is selected according to a change in the modulation technique during retransmission will be described in detail.

Figure 9A:
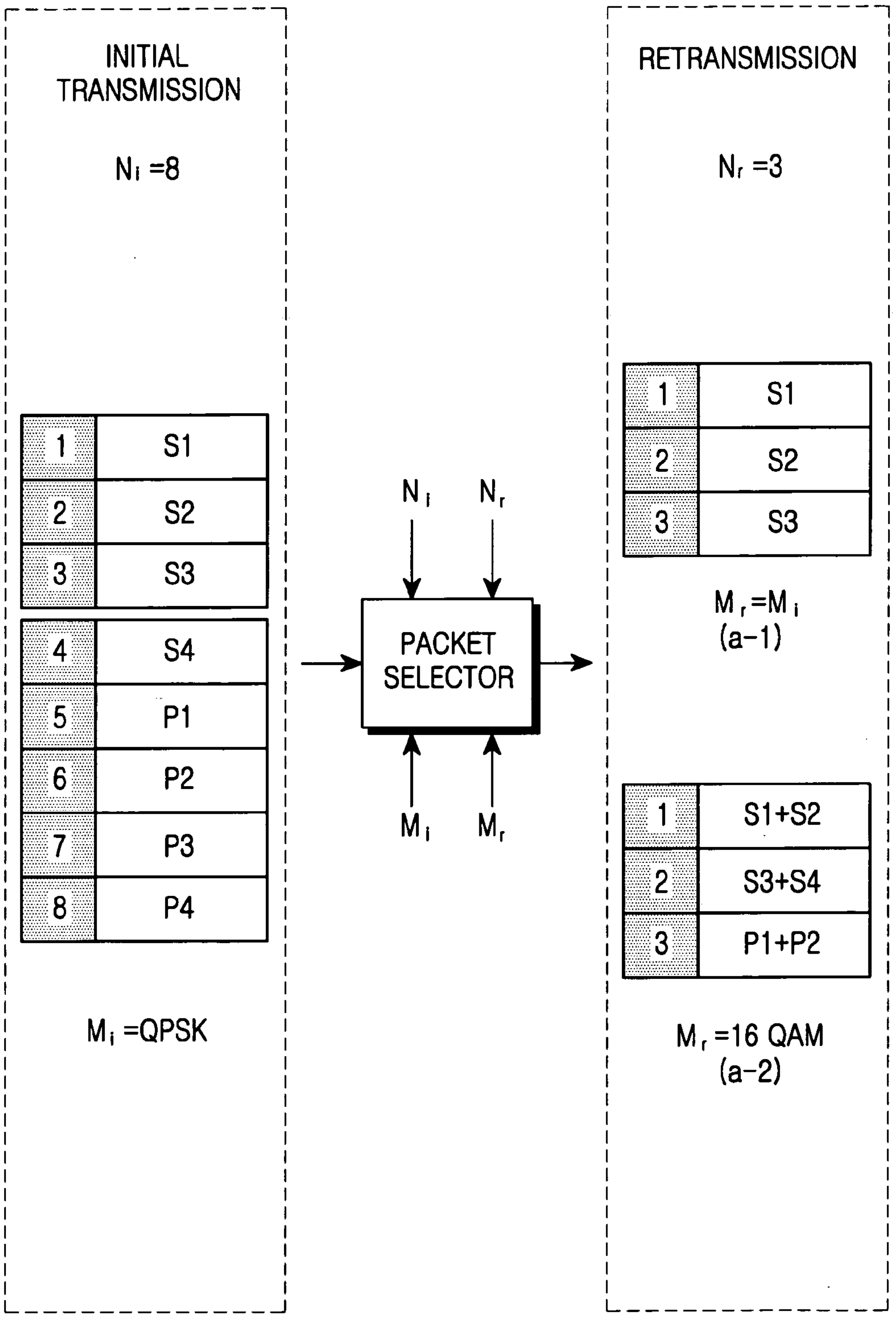
FIGS. 9A and 9B illustrate a method of transmitting packets by a transmitter and a method of combining received packets by a receiver according to an embodiment of the present invention, respectively.

FIG. 9A illustrates a method for selecting a transmission packet during retransmission by the packet selector 720 in the system using a coding rate ½ when the number of orthogonal codes available for retransmission is reduced to 3 from the 8 orthogonal codes available for initial transmission. In FIG. 9A, S represents a systematic sub-packet (or S sub-packet) comprised of only systematic bits, and P represents a parity sub-packet (or P sub-packet) comprised of only parity bits.

When the coding rate ½ is used, the S sub-packet is identical to the P sub-packet in size. Therefore, at initial transmission, the S sub-packets are transmitted using first 4 available orthogonal codes among the 8 available orthogonal codes, and the P sub-packets are transmitted using the last 4 available orthogonal codes.

When the modulation technique and the number of available codes are changed, an amount of the data to be actually transmitted is determined by Equations (1) and (2) below.

$$\alpha = \frac{\log_2 M_r}{\log_2 M_i},\ \beta = \frac{N_r}{N_i} \quad (1)$$

$$D_r = \alpha \times \beta \times D_i \quad (2)$$

In Equation (1), $M_i$ indicates an integer corresponding to a modulation technique at initial transmission, and $M_r$ indicates an integer corresponding to a modulation technique at retransmission. Further, $N_i$ indicates the number of codes available for initial transmission, and $N_r$ indicates the number of codes available for retransmission. In Equation (2), $D_i$ denotes the number of coded bits transmitted during initial transmission, and $D_r$ denotes the number of coded bits that can be transmitted during retransmission.

In Equations (1) and (2), the integer $M_i$ or $M_r$ indicating the modulation technique becomes 64 for 64QAM, 16 for 16QAM, 8 for 8PSK, and 4 for QPSK. FIG. 9A illustrates a method of selecting a transmission data packet when a modulation technique at initial transmission is QPSK and a modulation technique at retransmission is identical to the modulation technique at the initial transmission (case (a-1)) or changed to 16QAM (case (a-2)). At initial transmission, all the data packets are subject to symbol mapping such that 2 coded bits are mapped to one symbol, and the symbols are frequency-spread with 8 available orthogonal codes before being transmitted. In the case (a-1) of FIG. 9A, where 3 available orthogonal codes are assigned for retransmission and the modulation technique used for retransmission is identical to the modulation technique used for initial transmission, only ⅜ of the initially transmitted data is retransmitted in accordance with Equations (1) and (2). In this case, only the S sub-packets S1, S2, and S3, having used the first 3 available orthogonal codes, are transmitted. If another retransmission request is received again, the S sub-packet S4 and the P sub-packets P1 and P2, which were not transmitted at previous retransmission, will be transmitted. That is, through two retransmissions, all the S sub-packets and a part of the P sub-packets of the initially transmitted data can be transmitted. In this case, the receiver can perform combining between the same data packets.

On the contrary, in the case (a-2) of FIG. 9A where the modulation technique is changed to the high-order modulation of 16QAM during retransmission, 6/8 of the initially transmitted data can be transmitted in accordance with Equations (1) and (2). That is, although 2 coded bits were mapped to one symbol at initial transmission, 4 coded bits are mapped to one symbol at retransmission. Since the coded bits that were transmitted through 2 available orthogonal codes at initial transmission can be transmitted using one available orthogonal code, it is possible to transmit 2 times as much data as transmitted in the case (a-1). Therefore, as illustrated in the case (a-2) of FIG. 9A, through one retransmission, all the S sub-packets S1 to S4 and a part P1 and P2 of the P sub-packets of the initially transmitted data can be transmitted. If another retransmission request is received again, the S sub-packets S1 to S4 and the P sub-packets P3 and P4, which were not transmitted at previous retransmission, will be transmitted. That is, the S sub-packets are transmitted two times and the P sub-packets are transmitted once, thus maximizing the combining effect at the receiver.

The reason that a combination of the sub-packets is changed at retransmission is because in order to increase performance of a turbo decoder, priorities of the systematic bits and the parity bits may be changed as occasion demands. Therefore, it is possible to expect an increase in system performance by transmitting the sub-packets in the same combination or the sub-packets in the different combinations according to the number of retransmissions and the channel condition. When transmitting the packet mixedly comprised of the systematic bits and the parity bits in the existing method, the transmitter should transmit only a part of the data packet encoded by the channel encoder, so that the transmitted data packet is inevitably subject to random combining at the receiver. Such a method is effective in reducing the bit error rate (BER), but relatively less effective in reducing a frame error rate (FER). Unlike this, the transmitter according to the present invention transmits once again the entire packet comprised of only the systematic bits or the parity bits, so that the transmitted information bits can be effectively combined. In addition, it is possible to reduce the frame error rate by providing the combined coded bits to an input terminal of the turbo decoder.

Next, an operation of receiving data will be described with reference to the receiver illustrated in FIG. 8 corresponding to the transmitter illustrated in FIG. 7.

Data received from the transmitter is despread into modulated symbols by the despreader 812 using multiple available orthogonal codes used by the transmitter during transmission, and the despread symbols are serially output in the form of a data stream after being multiplexed. The demodulator 814 demodulates the modulated symbols according to a demodulation technique corresponding to the modulation technique used by the modulator 722 in the transmitter, generates LLR values for the demodulated coded bits, and provides the generated LLR values to the selective packet combiner 816. The selective packet combiner 816 combines the LLR values of the demodulated coded bits with previous LLR values in a bit unit (on a bit-by-bit basis). For this, the selective packet combiner 816 must include a buffer for storing the previous LLR values. In addition, since the combining must be performed between the same coded bits, the buffer must have a structure capable of separately storing LLR values for the S sub-packets and LLR values for the P sub-packets. Such a buffer structure can be realized with either two separate buffers or a single buffer with two separated storage areas.

The selective packet combiner 816 determines whether current transmission is initial transmission or retransmission and also determines whether LLR values of the demodulated coded bits are for the S sub-packet or the P sub-packet, based on information on the modulation technique at initial transmission, the current modulation technique and the number of available orthogonal codes. If the current transmission is initial transmission, the selective packet combiner 816 stores LLR values of the demodulated coded bits in the buffer for the S sub-packet and the buffer for the P sub-packet according to the determined results, and provides its output to the deinterleaving section 810. However, if the current transmission is not initial transmission, rather retransmission, the selective packet combiner 816 combines the LLR values of the demodulated coded bits with the LLR values stored in the buffers through the initial transmission or previous combining, in a bit unit. The combining, as described above, is performed between the same coded bits. That is, the LLR values of the coded bits for the S sub-packet among the LLR values of the demodulated coded bits are combined with the LLR values for the S sub-packet stored in the buffer, and the LLR values of the coded bits for the P sub-packet among the LLR values of the demodulated coded bits are combined with the LLR values for the P sub-packet stored in the buffer.

Meanwhile, instead of the selective packet combiner 816, a buffer may be arranged in a preceding stage of the demodulator 814 to perform symbol combining between the symbols modulated by the same modulation technique. That is, if it is assumed that two different modulation techniques were used over the entire transmission period, the buffer is divided into two areas and the selective packet combiner 816 performs combining between the symbols transmitted by the same modulation technique, thereby increasing reliability of the LLR values.

The coded bits combined by the selective packet combiner 816 are provided to the deinterleaving section 810. The coded bits deinterleaved by the deinterleavers 820 and 822 in the deinterleaving section 810 according to a given pattern used by the transmitter are provided to the channel decoder 824, where they are decoded according to a given demodulation technique. Among the coded bits transmitted during initial transmission, the minimum systematic bits or parity bits are combined to increase reliability of the data input to the channel decoder 824, resulting in an increase in the overall system performance. By checking a CRC included in the information bits decoded by the channel decoder 824, it is determined whether an error has occurred in the information bits. If a CRC error is detected by the CRC checker 826, the upper layer transmits a NACK signal, or a retransmission request signal, to the transmitter. However, if no CRC error is detected, the upper layer transmits an ACK signal confirming receipt of the information bits. When the NACK signal is transmitted, the errored coded bits are stored in the packet buffers of the selective packet combiner 816. Otherwise, when the ACK signal is transmitted, the packet buffers are initialized to store new packets to be transmitted next.

Figure 9B:
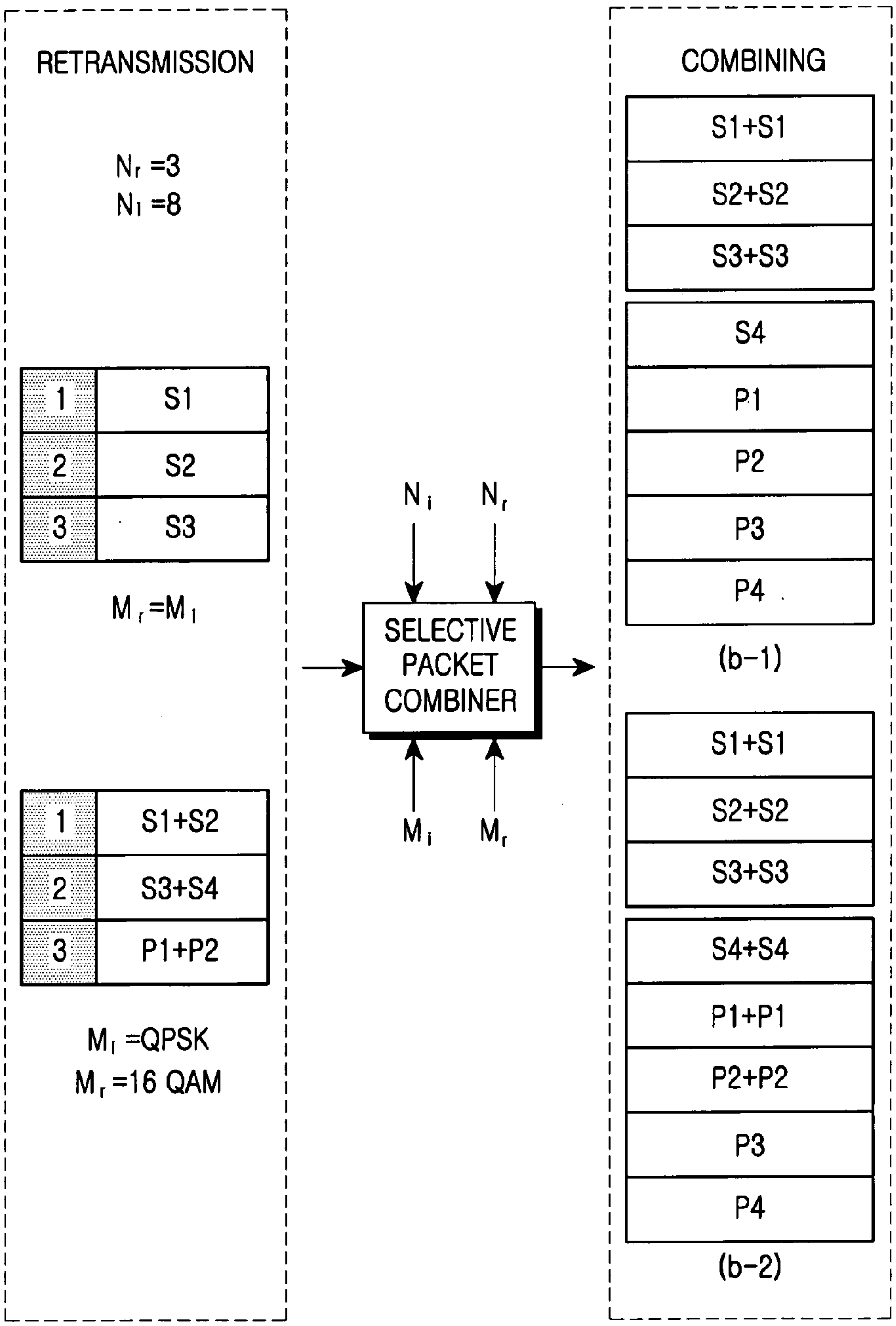

FIG. 9B illustrates a process of combining the packets retransmitted according to the modulation technique illustrated in FIG. 9A with the initially transmitted packets by the selective packet combiner 816 illustrate in FIG. 8.

The packet combining process at the receiver will be described with reference to FIG. 9B. In the case of (b-1), where the modulation technique used at retransmission is identical to the modulation technique used at initial transmission, since the number of transmittable data packets is decreased in proportion to the decreased number of available orthogonal codes, only the sub-packets S1, S2, and S3 transmitted by the first 3 available orthogonal codes are combined with the initially transmitted data, and the remaining sub-packets must wait for next retransmission.

Figure 5A:
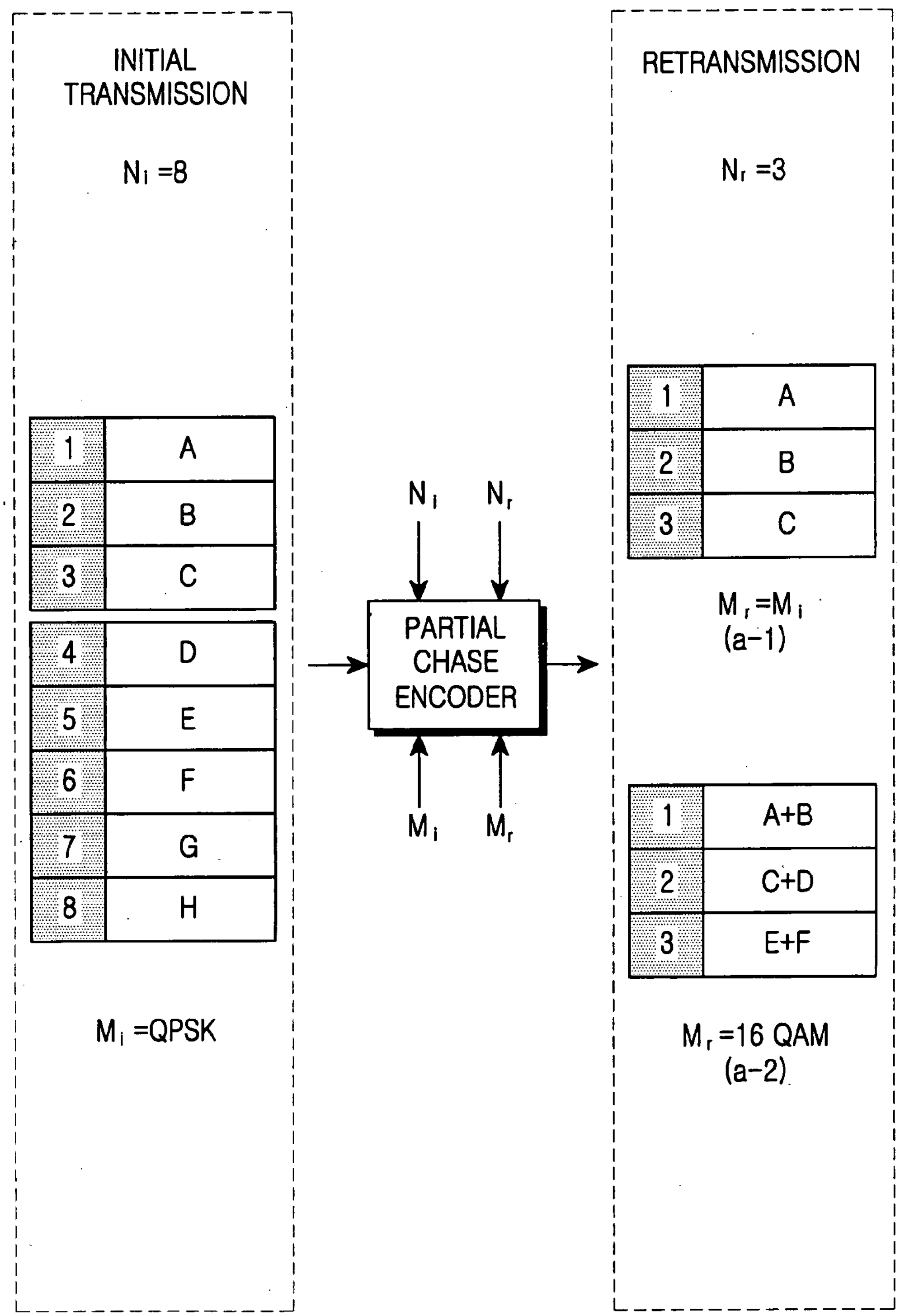
FIGS. 5A and 5B illustrate a method of transmitting packets by a transmitter and a method of combining received packets by a receiver according to the prior art, respectively.
Figure 5B:
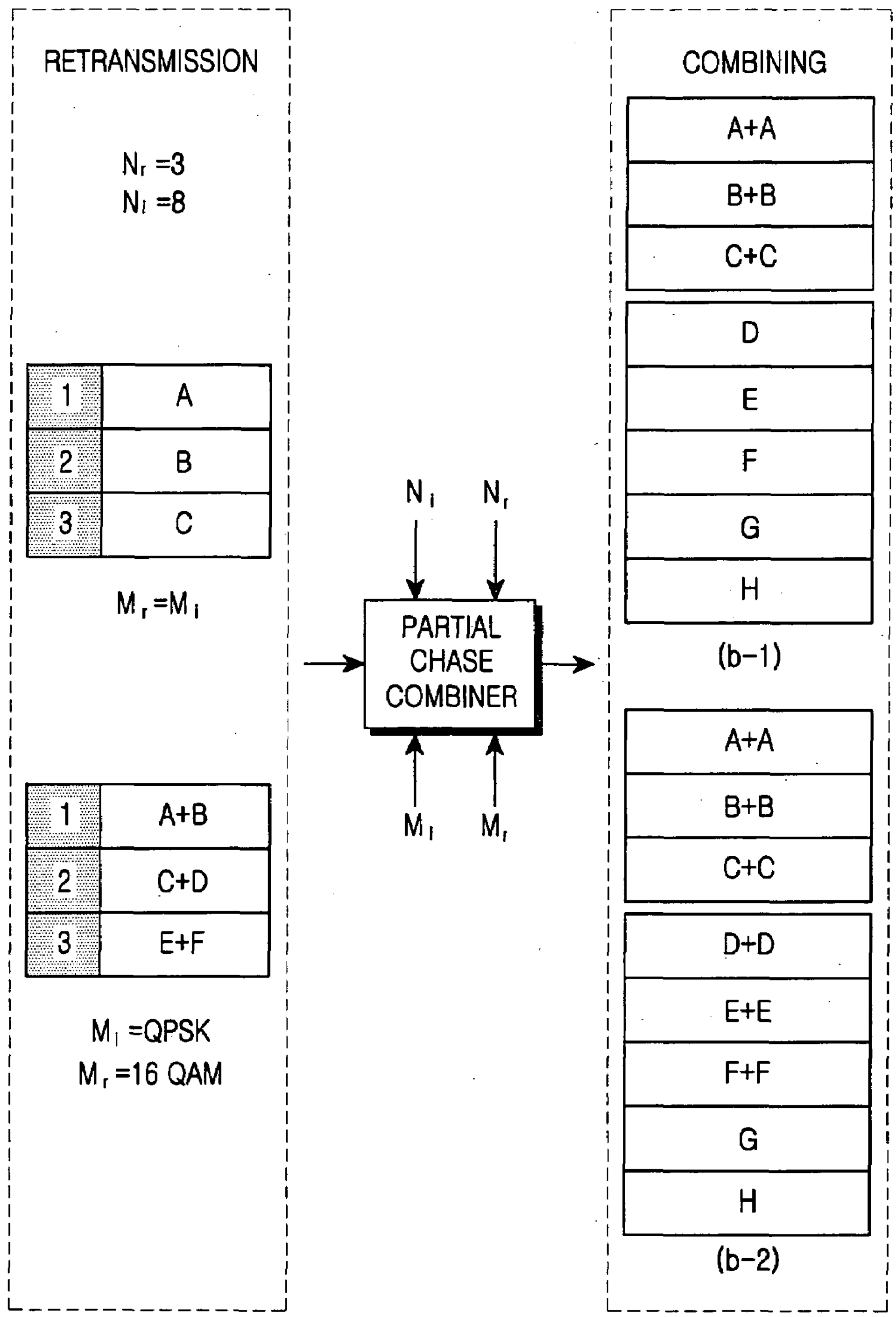

Now, a comparison will be made between this method and the convention method illustrated in FIG. 5B. In FIG. 5B, since the interleaved data is randomized, it is almost impossible to combine all the information bits even through two retransmissions. Therefore, though it is possible to increase reliability in a bit unit, it is difficult to increase reliability in a frame unit. However, in FIG. 9B, since it is possible to transmit at least all the systematic bits through the two retransmissions, it is possible to increase reliability in a frame unit by combining the systematic bits. As a result, this contributes to an improvement in throughput of the system. For reference, shaded blocks in FIG. 9B represent the sub-packets combined according to the embodiment of the present invention.

However, in the case of (b-2), where the modulation technique at retransmission is changed to 16QAM, although the number of orthogonal codes available for retransmission is 3, an amount of actually transmitted data is identical to an amount of data transmitted through the 6 orthogonal codes during initial transmission. This is because although two coded bits are mapped to one symbol at initial transmission in the QPSK, four coded bits are mapped to one symbol at retransmission in the 16QAM. Therefore, the receiver performs combines all the initially transmitted S sub-packets S1 to S4, and a part P1 and P2 of the initially transmitted P sub-packets. It should be noted herein that all the initially transmitted S sub-packets are combined through one retransmission. A comparison will be made between this method and the convention method illustrated in FIG. 5B.

In FIG. 5B, only a part of the data is combined to improve the bit error rate. However, in FIG. 9B, since all the S sub-packets can be combined, it is possible to obtain a combing effect on all the information bits in the light of the characteristic of the turbo code. As a result, the entire performance of the channel decoder is improved, thus reducing the frame error rate.

Although the transmission and reception operation only for the first retransmission after the initial transmission has been described, a transmission and reception operation for the succeeding retransmissions would be obvious to those skilled in the art.

2. Second Embodiment (Coding Rate is ¾, and the Number of Orthogonal Codes Available for Retransmission is Decreased)

Figure 10A:
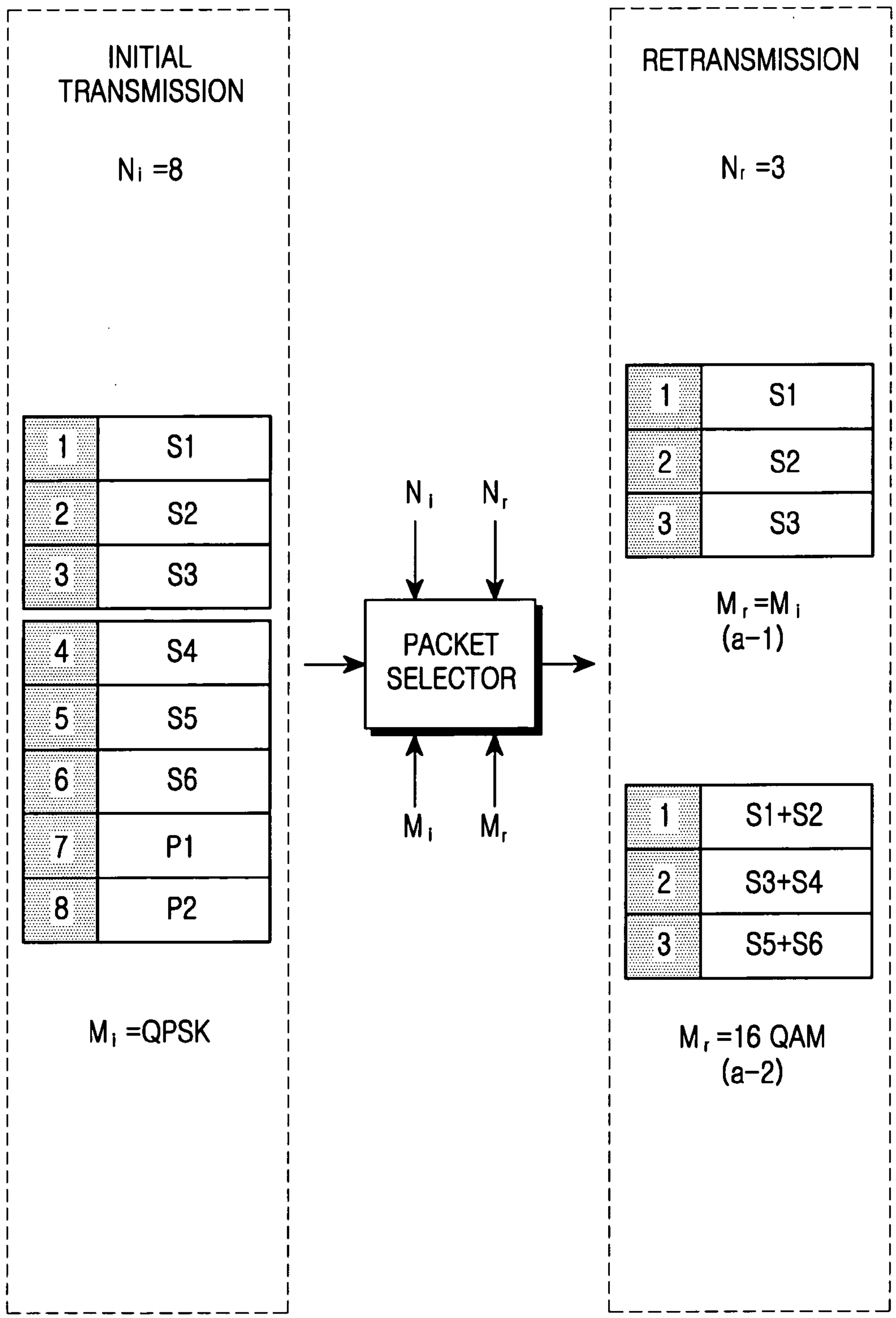
FIGS. 10A and 10B illustrate another method of transmitting packets by a transmitter and another method of combining received packets by a receiver according to an embodiment of the present invention, respectively.
Figure 10B:
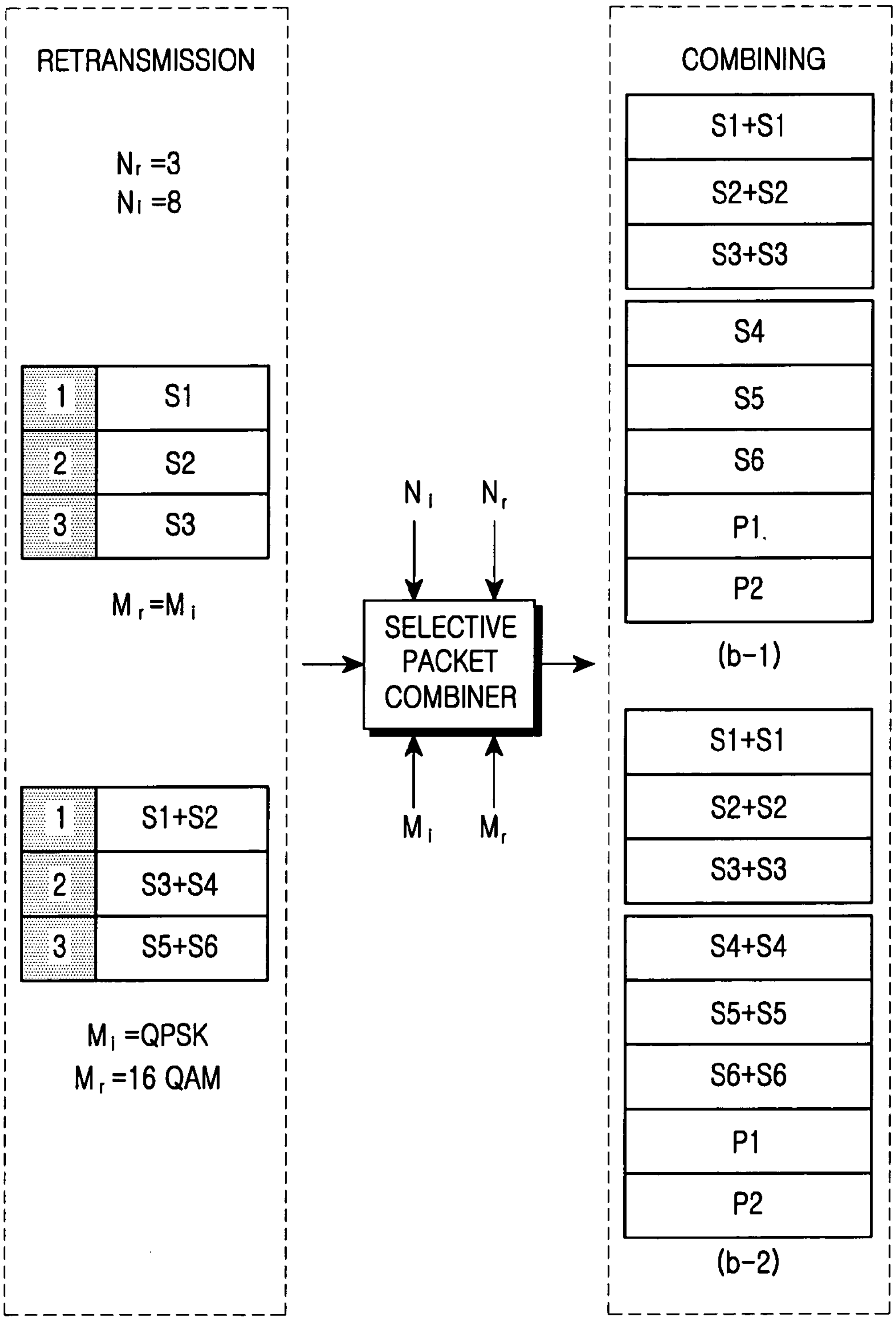

Unlike when the coding rate is ½, if the coding rate is ¾, the systematic bits among the coded bits from the channel encoder 712 are 3 times larger in number than the parity bits. This means that the number of the coded bits provided to the first interleaver 716 is 3 times larger than the number of the coded bits provided to the second interleaver 718. For better understanding, reference will be made to FIGS. 10A and 10B. Among a total of 8 available orthogonal codes, 6 orthogonal codes are assigned to the S sub-packets S1, S2, S3, S4, S5, and S6, and the remaining 2 orthogonal codes are assigned to the P sub-packets P1 and P2. Like the first embodiment, where the coding rate is ½, this embodiment uses QPSK at initial transmission, and uses the same modulation technique or a high-order modulation technique of 16QAM at retransmission. FIG. 10A illustrates a transmission method (a-1) in which the modulation technique used at retransmission is identical to the modulation technique used at initial transmission. FIG. 10B illustrates a reception method (b-1) in which the modulation technique used at retransmission is identical to the modulation technique used at initial transmission. Further, FIG. 10A illustrates a transmission method (a-2) in which the modulation technique used at retransmission is a high-order modulation technique of 16QAM compared with the modulation technique used at initial transmission, and FIG. 10B illustrates a reception method (b-2) in which the modulation technique used at retransmission is a high-order modulation technique of 16QAM compared with the modulation technique used at initial transmission. Also, the second embodiment, it is assumed that the number of orthogonal codes used for retransmission is smaller than the number of orthogonal codes used for initial transmission. That is, 8 available orthogonal codes were used at initial transmission, but 3 available orthogonal codes are used at retransmission, so the number of available orthogonal codes is reduced by 5. The second embodiment is identical to the first embodiment in function of the transmitter and the receiver in the same condition. Therefore, a description of the second embodiment will be focused on the functions of the packet selector 720 illustrated in FIG. 7 and the selective packet combiner 816 illustrated in FIG. 8.

The packet selector 720, as described in conjunction with the case where the coding rate is ½, selects a packet to be transmitted during retransmission based on control information of the modulation technique at initial transmission and the current modulation technique and information on the number of available codes. As described with reference to the case where the coding rate is ½, the number of coded bits required at retransmission is determined through Equations (1) and (2). That is, since the size of the retransmission packet for the same modulation technique and 16QAM depends upon only the changed number of available orthogonal codes, the packet size at retransmission becomes ⅜ and ⁶⁄₈ times the packet size at initial transmission. FIG. 10A illustrates an exemplary combination of transmission packets selected by the packet selector 720. However, if another retransmission request is received again, the combination of the transmission packets illustrated in FIG. 10A may be changed. That is, in the case of (a-1), the sub-packets S1, S2, and S3 are transmitted at a first transmission and the sub-packets S4, S5, and S6 are transmitted at a second retransmission, so that the receiver can combine all the S sub-packets. A function of the selective packet combiner 816 in the receiver is illustrated in (b-1) of FIG. 10B, which corresponds to (a-1) of FIG. 10A. However, if the modulation technique at retransmission is 16QAM, the sub-packets S1, S2, S3, S4, S5, and S6 are transmitted at first retransmission, and the sub-packets P1, P2, S1, S2, S3, and S4 are transmitted at second retransmission. Alternatively, only the S sub-packets may be transmitted even at second retransmission, thus increasing the combining effect. In either case, it is possible to improve the frame error rate.

In addition, the packet selector 720 can select the packets comprised of only the systematic bits or the parity bits in various combinations. As described with reference to when the coding rate is ½, the packets may be sequentially selected in a predetermined pattern or selected in a certain combination according to the modulation technique and the number of retransmissions. The predetermined packet selecting pattern must be recognized by the receiver so that the selective packet combiner 816 can properly select the packets.

FIG. 10B illustrates a process of distributing selected packets retransmitted according to the modulation technique illustrated in FIG. 10A to the corresponding buffers of the selective packet combiner 816 and combining these packets with the initially transmitted packets stored in the buffers of the selective packet combiner 816, at a coding rate ¾. For example, if QPSK modulation is used at retransmission, only half of the S sub-packets are partially combined. Therefore, another retransmission should be performed in order to fully combine the S sub-packets. FIG. 9B illustrates exemplary packet combinations in which priorities are given to the systematic packets. This is because if the systematic bits are first compensated, the coded bits input to the channel decoder increase in reliability. If 16QAM is used at retransmission, all the S sub-packets can be combined through one retransmission, thus maximizing the combining effect. However, the channel condition must be very good in order to obtain a better combining effect than when the same modulation technique is used at initial transmission and retransmission.

3. Third Embodiment (Coding Rate is ½, and the Number of Orthogonal Codes Available for Retransmission is Increased)

Figure 11A:
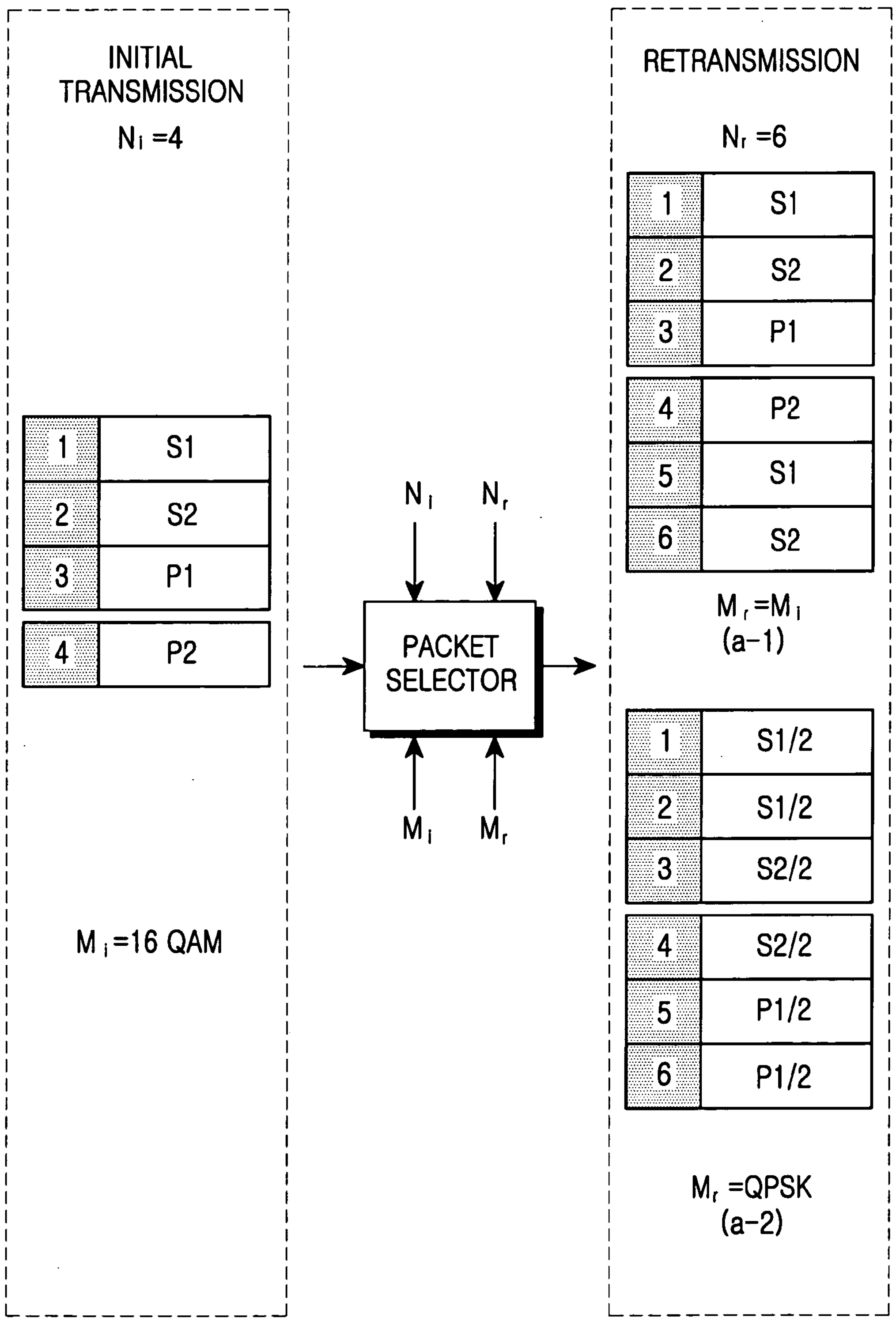
FIGS. 11A and 11B illustrate another method of transmitting packets by a transmitter and another method of combining received packets by a receiver according to an embodiment of the present invention, respectively.

FIG. 11A illustrates a method for selecting transmission packets during retransmission by the packet selector 720 in the system using a coding rate ½ when the number of orthogonal codes available for retransmission is increased to 6 from the 4 orthogonal codes at initial transmission. When the coding rate ½, the S packets are identical in size to the P packets. Therefore, at initial transmission, the S sub-packets are transmitted using first 2 available orthogonal codes among the 4 available orthogonal codes and the P sub-packets are transmitted using the remaining 2 available orthogonal codes. FIG. 11A illustrates a method of selecting a transmission data packet when a modulation technique at initial transmission is 16QAM and a modulation technique at retransmission is identical to the modulation technique at the initial transmission (case (a-1)) or changed to QPSK (case (a-2)). At initial transmission, all the data packets are subject to symbol mapping such that 4 coded bits are mapped to one symbol, and the symbols are frequency-spread with the 4 available orthogonal codes before being transmitted.

Figure 6A:
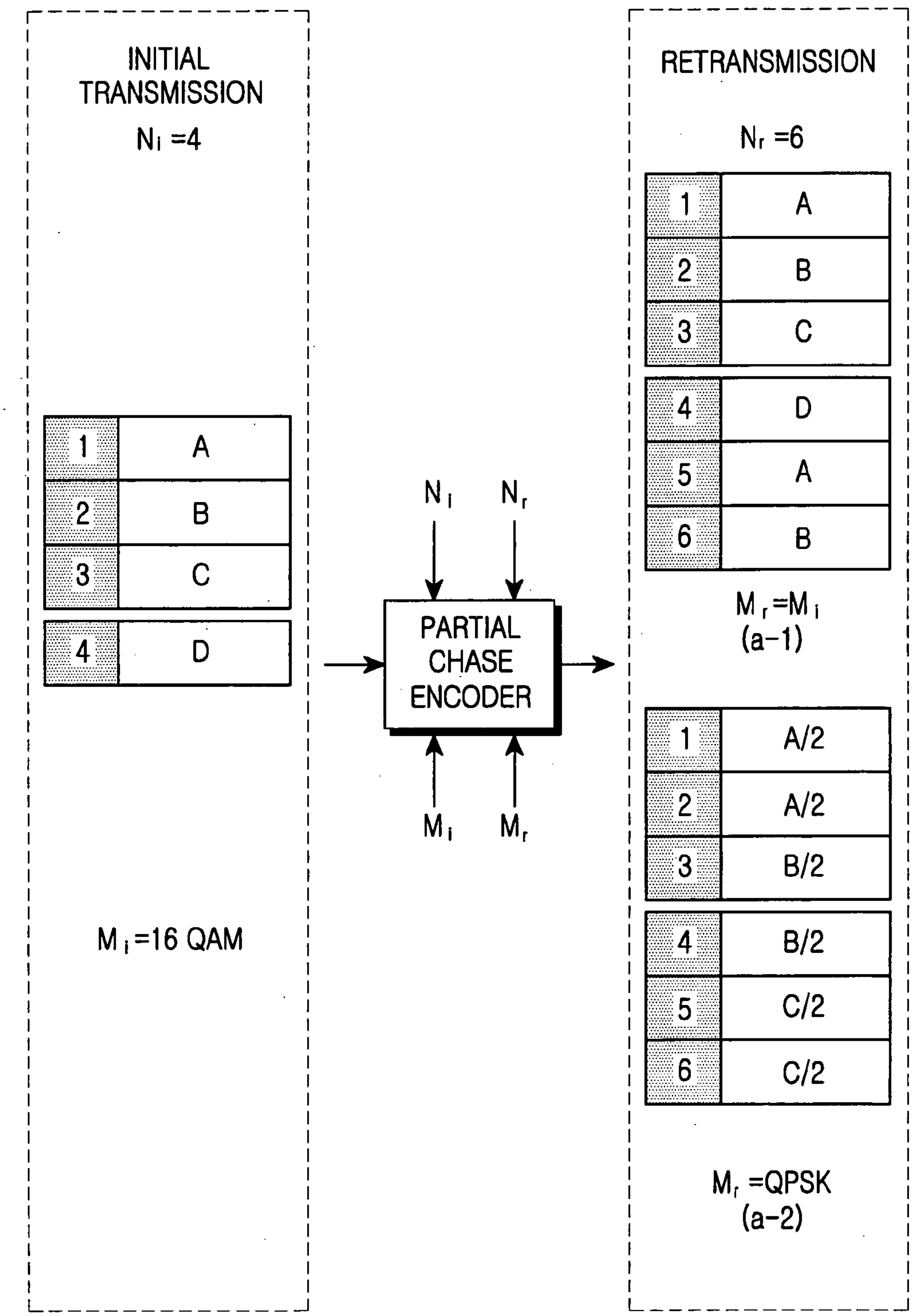
FIGS. 6A and 6B illustrate another method of transmitting packets by a transmitter and another method of combining received packets by a receiver according to the prior art, respectively.

If, as illustrated in (a-1) of FIG. 11A, 6 available orthogonal codes are assigned for retransmission and the modulation technique (16QAM) used for retransmission is identical to the modulation technique used for initial transmission, half of the initially transmitted data is retransmitted in accordance with Equations (1) and (2). In this case, the entire data and the S sub-packets S1 and S2 using the first 2 available orthogonal codes are transmitted through one retransmission. That is, it is possible to transmit the sub-packets S1, S2, P1, P2, S1 and S2 using the 6 available orthogonal codes. If another retransmission request is received again, the packet selector 720 may transmit the sub-packets in either the previous combination or a different combination of S1, S2, P1, P2, P1 and P2 according to priorities of the sub-packets.

On the contrary, as illustrated in (a-2) of FIG. 11A, if the modulation technique at retransmission is changed to the low-order modulation of QPSK, ¾ of the initially transmitted data can be transmitted in accordance with Equations (1) and (2). That is, 2 coded bits are mapped to one symbol at retransmission. Therefore, since the coded bits that were transmitted through one available orthogonal code at initial transmission can be transmitted using 2 available orthogonal codes, it is possible to transmit half of the data transmitted in the case of (a-1). Therefore, as illustrated in (a-2) of FIG. 11A, through one retransmission, the S sub-packets S1, S2, and P1 can be transmitted. If another retransmission request is received again, the S sub-packets S1, S2, and P2 are transmitted. That is, the S sub-packets are transmitted two times and the P sub-packets are transmitted once, thus maximizing the combining effect at the receiver. The opposites are also available.

Figure 1:
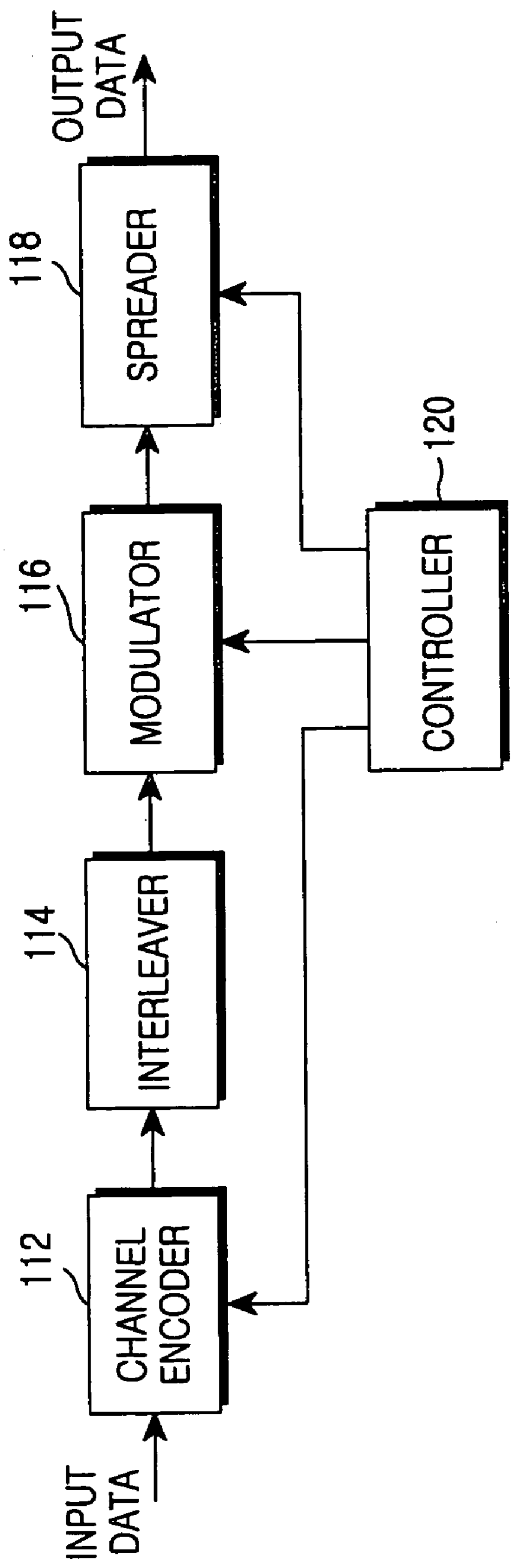
FIG. 1 illustrates a structure of a transmitter in a conventional CDMA mobile communication system for high-speed data transmission.
Figure 2:
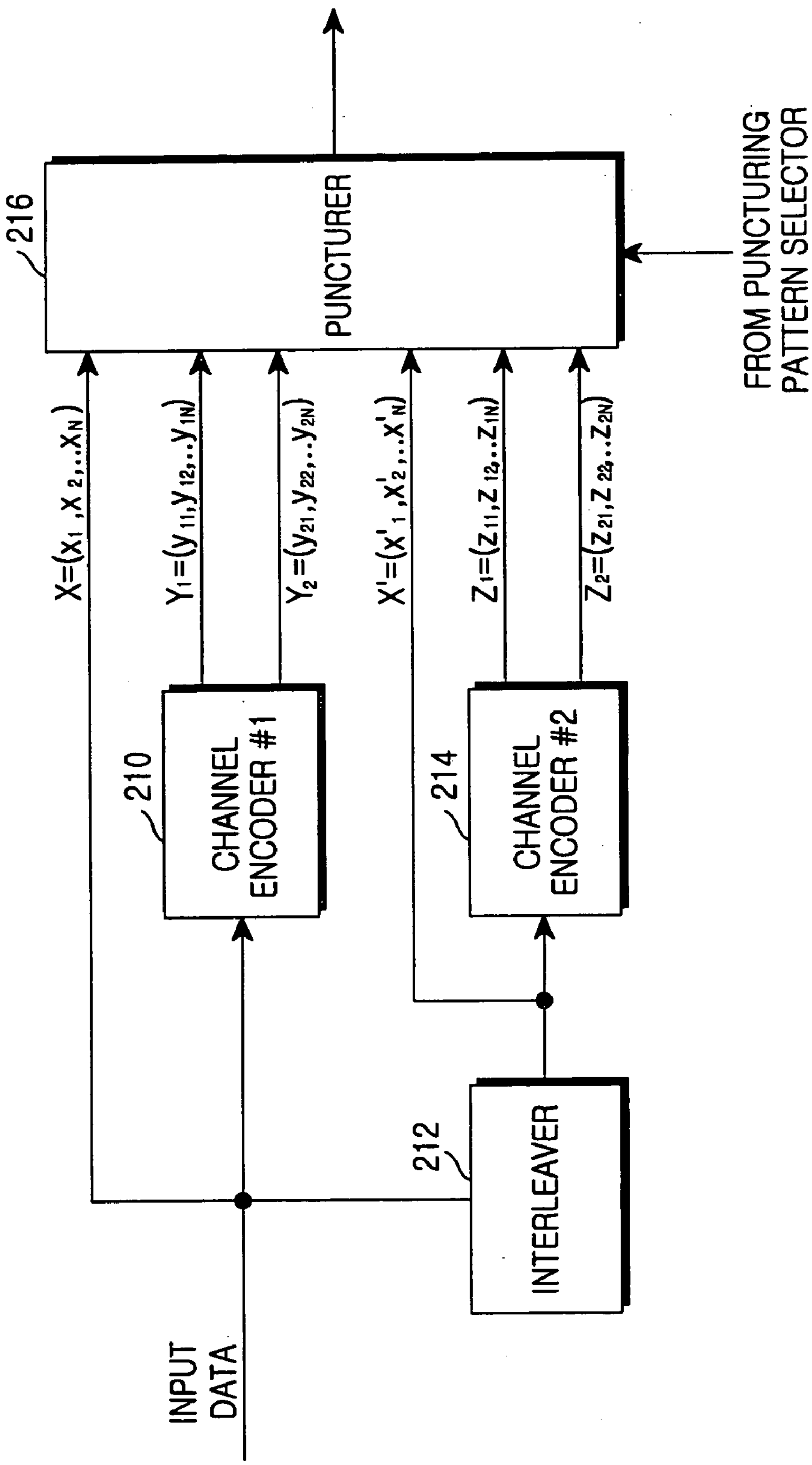
FIG. 2 illustrates a detailed structure of the channel encoder in FIG. 1.
Figure 3:
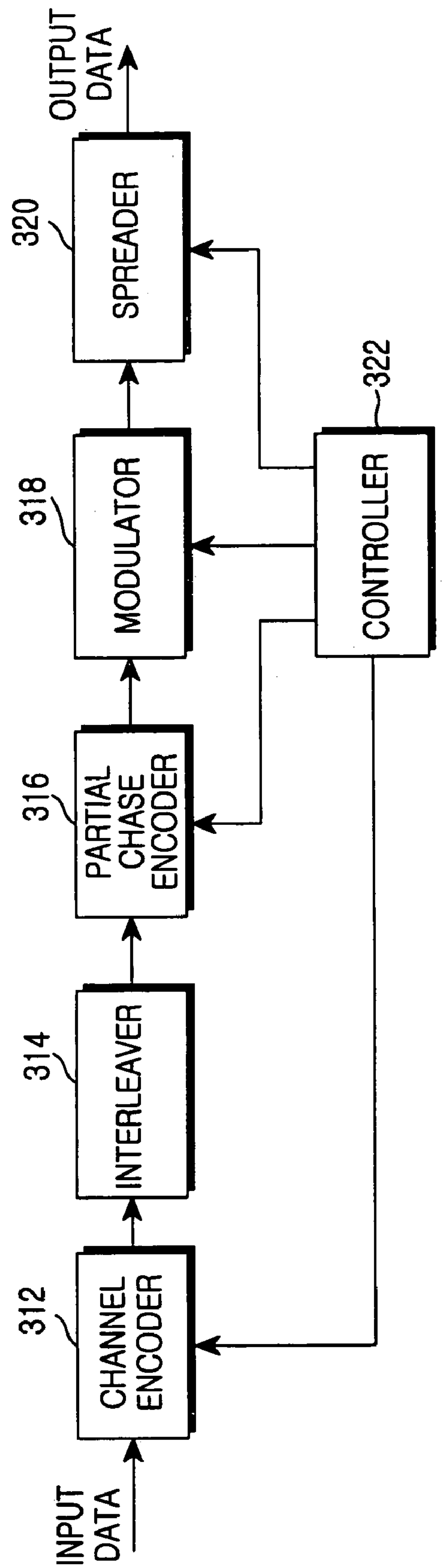
FIG. 3 illustrates a structure of a transmitter using variable modulation at retransmission in a conventional CDMA mobile communication system for high-speed data communication.
Figure 4:
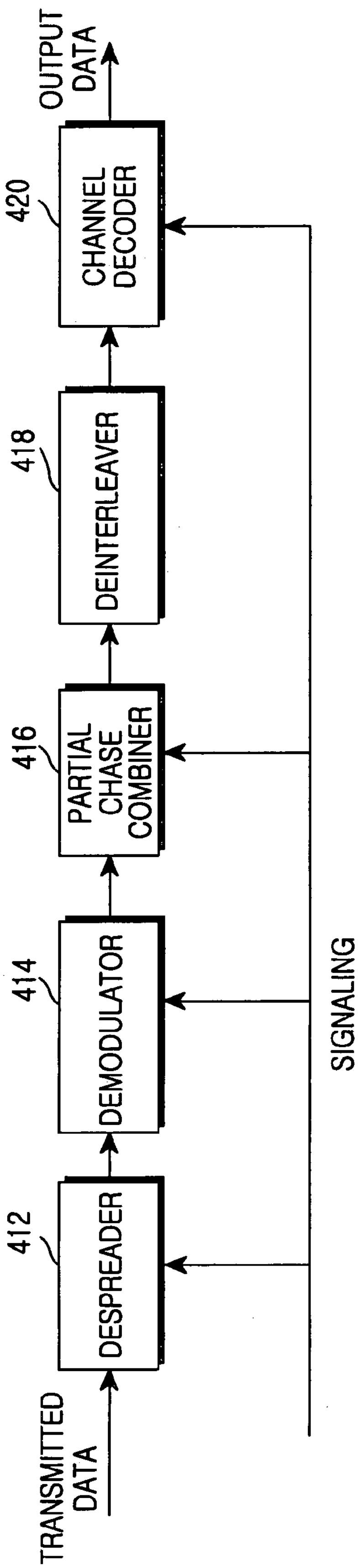
FIG. 4 illustrates a structure of a receiver corresponding to the transmitter of FIG. 3.

FIG. 1B illustrates a process of combining the packets retransmitted according to the modulation technique illustrated in FIG. 11A with the initially transmitted packets by the selective packet combiner 816 illustrated in FIG. 8.

Figure 6B:
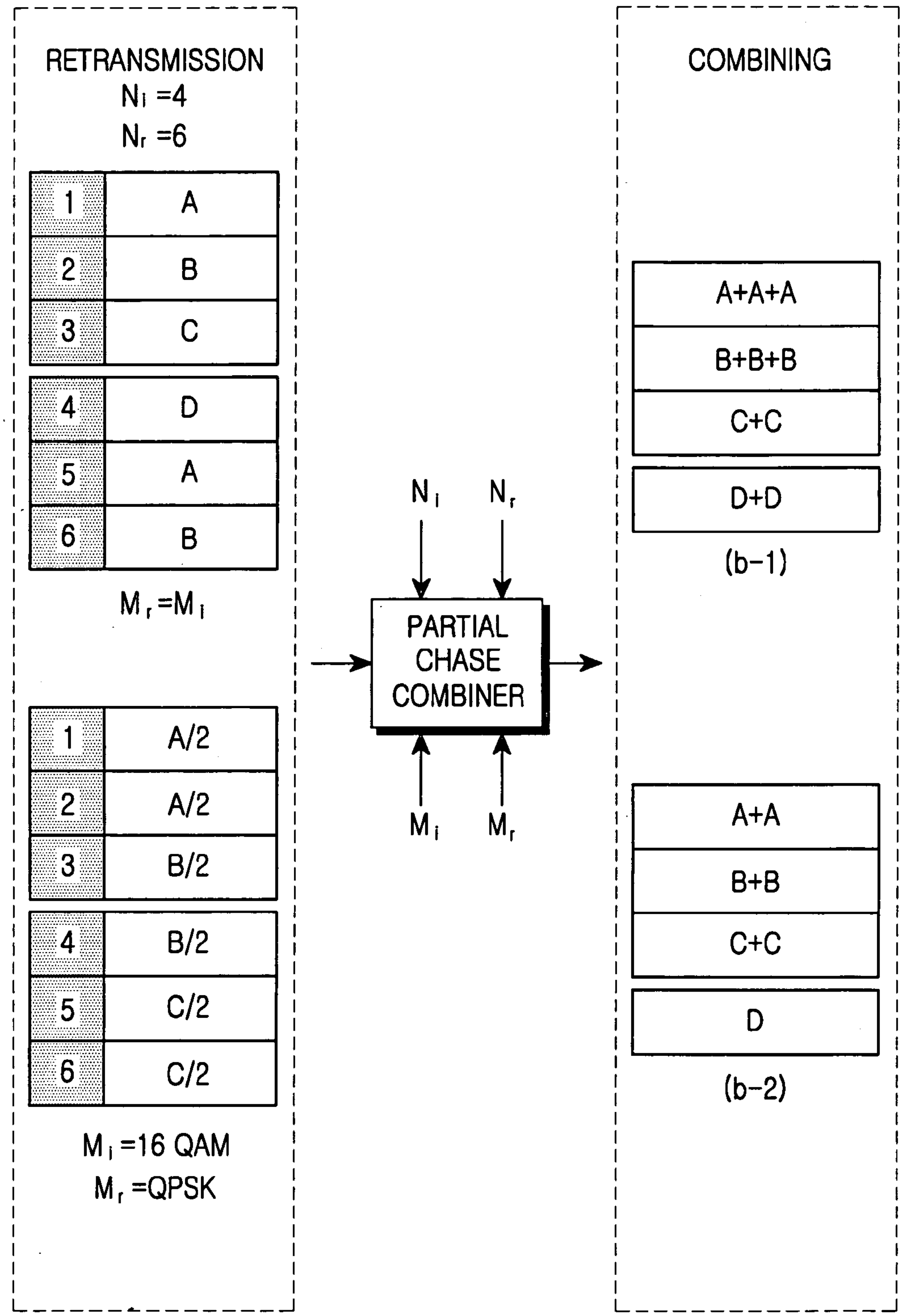
Figure 11B:
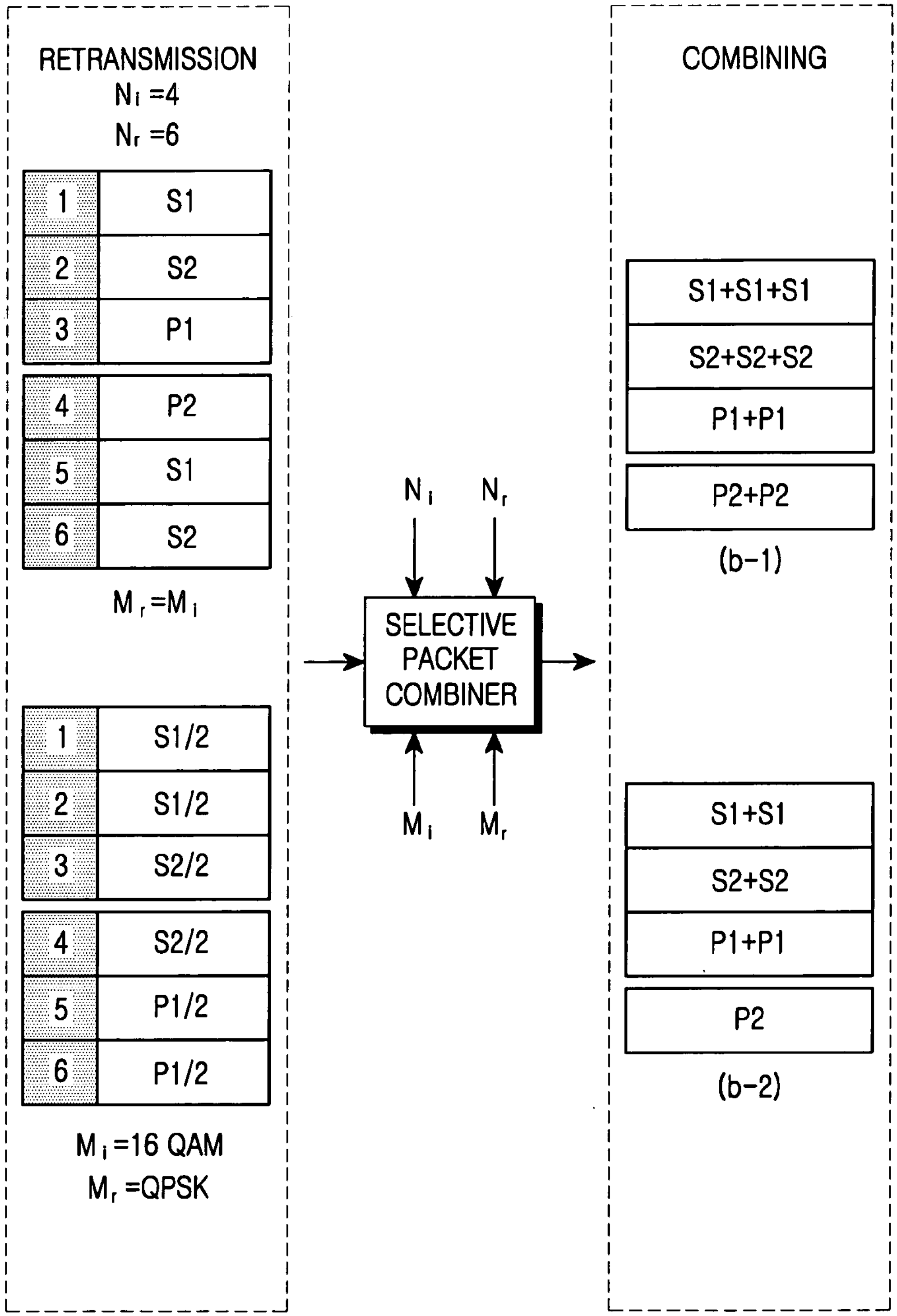

The packet combining process at the receiver will be described with reference to FIG. 11B. In the case (b-1) of FIG. 11B, where the modulation technique used at retransmission is identical to the modulation technique used at initial transmission, since the number of transmittable data packets is increased in proportion to the increased number of available orthogonal codes, the S sub-packets in addition to the entire data can be transmitted. As a result, through one retransmission, the initially transmitted data is combined with the S sub-packets two times and with the P sub-packets one time, thus maximizing the combining effect. A comparison will be made between this method and the conventional method illustrated in FIG. 6B. In FIG. 6B, since the interleaved data is randomized, though the entire packet is combined through retransmission, additional combining is performed in a bit unit, improving reliability in a bit unit. However, it is difficult to expect an improvement in reliability in a frame unit. In the case (b-1) of FIG. 11B, since not only the entire packet but also the S sub-packets can be transmitted through one retransmission, it is possible to increase reliability in a frame unit by combining the systematic bits. As a result, this contributes to an improvement in throughput of the system.

However, in the case (b-2) of FIG. 1B, where the modulation technique at retransmission is changed to QPSK, although the number of orthogonal codes available for retransmission is 6, an amount of actually transmitted data is identical to an amount of data transmitted through the 3 orthogonal codes at initial transmission. Therefore, the actual combining is performed on the sub-packets S1, S2, and P1. It should be noted herein that at least the S sub-packets are fully combined through one retransmission. A comparison will be made between this method and the conventional method illustrated in FIG. 5B. In FIG. 5B, only a part of the data is combined to improve the bit error rate. However, in the case (b-2) of FIG. 11B, since the S sub-packets can be fully combined, it is possible to obtain a combing effect on the entire information bits in the light of the characteristic of the turbo code. As a result, the entire performance of the channel decoder is improved, thus reducing the frame error rate.

4. Fourth Embodiment (Coding Rate is ¾, and the Number of Orthogonal Codes Available for Retransmission is Increased)

Unlike when the coding rate is ½, if the coding rate is ¾, the systematic bits among the coded bits from the channel encoder 712 are 3 times larger in number than the parity bits. Among a total of 4 available orthogonal codes, 3 orthogonal codes are assigned to the S sub-packets S1, S2, and S3, and the remaining 1 orthogonal code is assigned to the P sub-packet P. Herein, when the coding rate is ½ and the number of available orthogonal codes is 2, among a total of 2 available orthogonal codes, one orthogonal codes is assigned to the S sub-packet S and the other one is assigned to the P sub-packet P. But in case of the coding rate ¾, at least, the total number of orthogonal codes should be more than 4. Among a total of available orthogonal codes, three orthogonal codes is assigned to the S sub-packets (S1,S2,S3) and one orthogonal code is assigned to the P sub-packet P. In other words, when the coding rate is ½, at least, the number of available orthogonal codes should be more than 2. On the other hand, in case of the coding rate ⁴⁄₃, it should be more than 4. This embodiment uses 16QAM at initial transmission, and uses the same modulation technique or a low-order modulation technique of QPSK at retransmission. Examples in which the modulation technique used at retransmission is identical to the modulation technique used at initial transmission are illustrated in (a-1) of FIG. 12A and (b-1) of FIG. 12B. Further, examples in which the low-order modulation technique of QPSK is used at retransmission are illustrated in (a-2) of FIG. 12A and (b-2) of FIG. 12B. It is assumed that 4 available orthogonal codes were used at initial transmission, and 6 available orthogonal codes are used at retransmission.

Figure 12A:
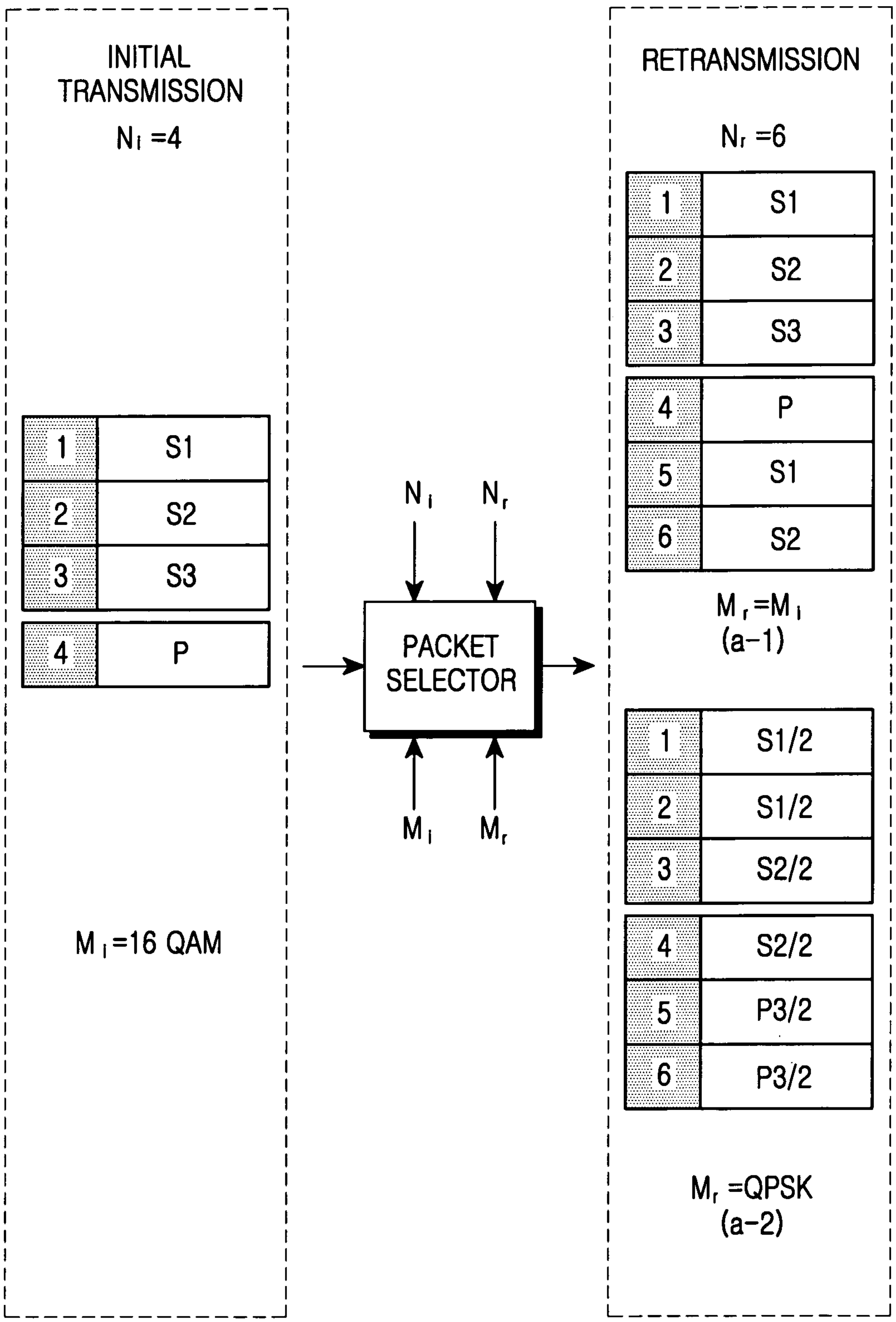
FIGS. 12A and 12B illustrate another method of transmitting packets by a transmitter and another method of combining received packets by a receiver according to an embodiment of the present invention, respectively.

The packet selector 720, as described in conjunction with when the coding rate is ½, selects a packet to be transmitted at retransmission based on control information of the modulation technique at initial transmission and the current modulation technique and information on the number of available codes. The number of coded bits required at retransmission is determined through Equations (1) and (2). That is, the packet size at retransmission becomes 3⁄2 and ¾ times the packet size at initial transmission for the same modulation technique and the QPSK, respectively. FIG. 12A illustrates an exemplary combination of retransmission packets selected by the packet selector 720. However, if another retransmission request is received again, the combination of the transmission packets may be changed.

In the case (a-1) of FIG. 12A where the modulation technique used at retransmission is identical to the modulation technique used at initial transmission, since the number of orthogonal codes available for retransmission is increased, the parity sub-packet can be additionally transmitted using the remaining available orthogonal codes after all the sub-packets are transmitted, thus increasing the combining effect. At a second retransmission, another parity sub-packet may be transmitted. However, in the case (a-2) of FIG. 12A where the modulation technique at retransmission is QPSK, all the S sub-packets are transmitted at a first transmission and the sub-packets P, S1 and S2 are transmitted at second retransmission. Alternatively, even at the second retransmission, only the S sub-packets may be transmitted thus to increase the combining effect on the S sub-packets. In either case, it is possible to improve the frame error rate.

In addition, the packet selector 720 can select the packets comprised of only the systematic bits or the parity bits in various combinations. As described with reference to when the coding rate is ½, the packets may be sequentially selected in a predetermined pattern or selected in a certain combination according to the modulation technique and the number of retransmissions. The predetermined packet selecting pattern must be recognized by the receiver so that the selective packet combiner 816 can properly select the data packets.

Figure 12B:
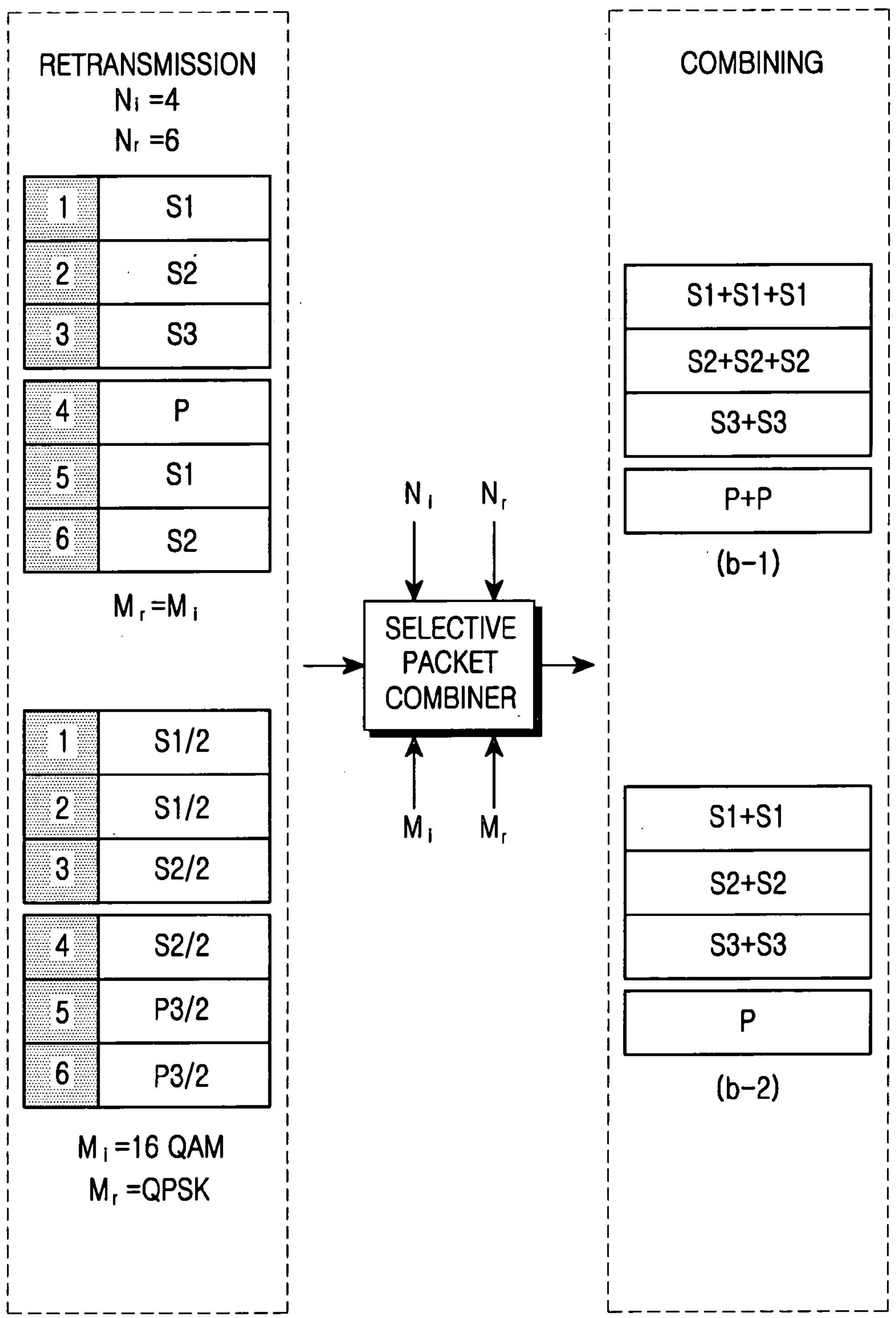

FIG. 12B illustrates a process of combining transmitted packets selected according to the modulation technique illustrated in FIG. 12A with the initially transmitted packets stored in the buffers of the selective packet combiner 816, at a coding rate ¾. For example, if the modulation technique used at retransmission is identical to the modulation technique used at initial transmission, the entire packet can combined and then S sub-packets can be additionally combined through one retransmission (case (b-1)). FIG. 12B illustrates exemplary packet combinations in which priorities are given to the systematic packets because if the systematic bits are first compensated, the coded bits input to the channel decoder increase in reliability.

In the case (b-2) of FIG. 12B where the low-order modulation technique of QPSK is used at retransmission, all the S sub-packets are transmitted through one retransmission, thus maximizing the combining effect. By doing so, it is possible to improve the frame error rate compared with the conventional method.

5. Change in Modulation Technique

Figure 13:
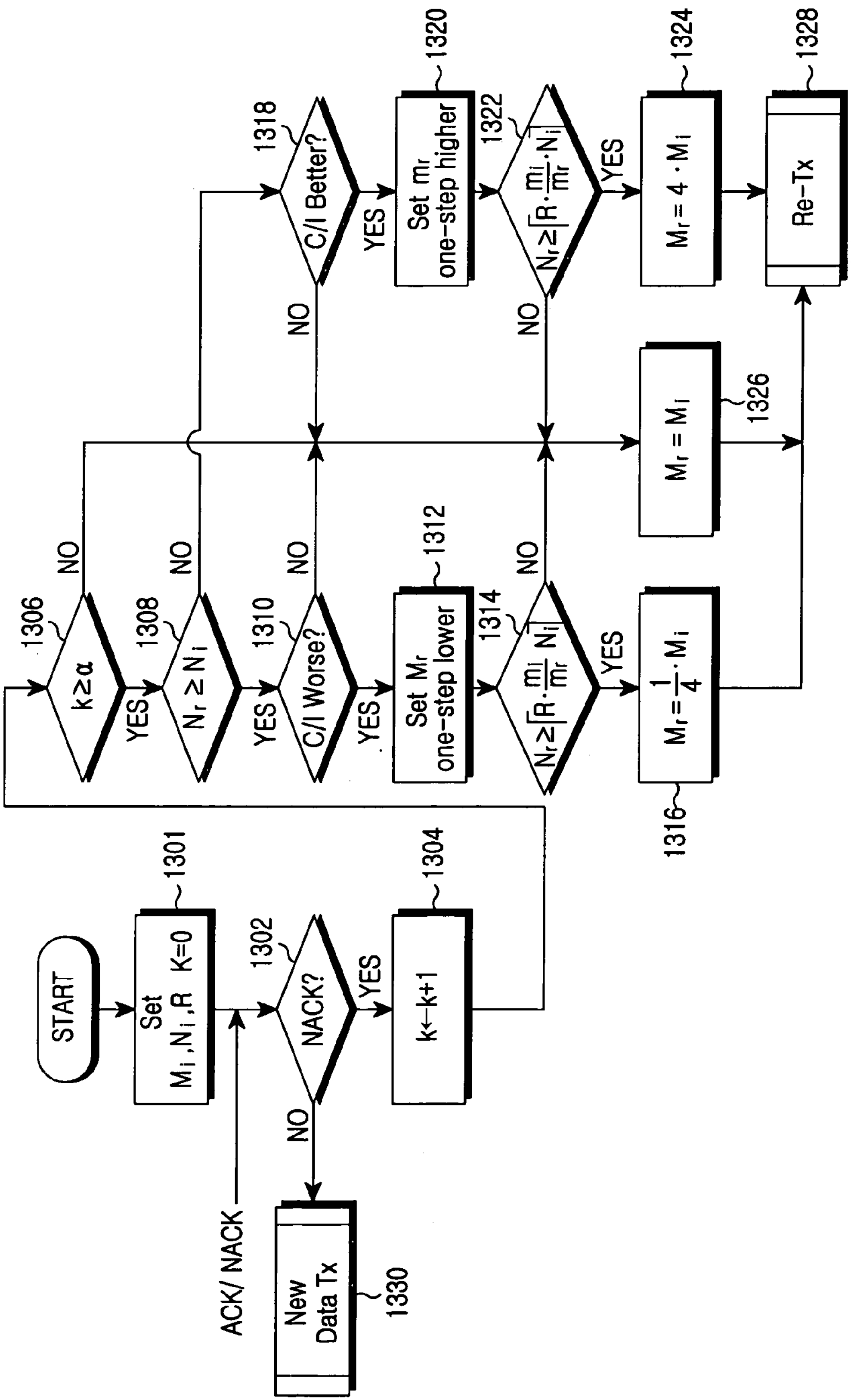
FIG. 13 illustrates a procedure for changing a modulation technique at retransmission in a CDMA mobile communication system according to an embodiment of the present invention.

FIG. 13 illustrates a procedure for determining a modulation technique when a number of orthogonal codes available for retransmission is different from a number of orthogonal codes available for initial transmission, according to an embodiment of the present invention.

Referring to FIG. 13, if a HARQ is started, a transmitter determines, in step 1301, initial transmission-related parameters and transmits a new data packet based on the determined parameters. A receiver then transmits a NACK or ACK signal according to whether the packet initially transmitted by the transmitter has an error. That is, the transmitter receives the NACK or ACK signal according to whether an error has occurred in the initially transmitted packet. The initial transmission-related parameters may include a coding rate R, a modulation technique $m_i$, and the number $N_i$ of available orthogonal codes. The transmitter determines in step 1302 whether NACK is received from the receiver. If ACK is received instead of the NACK, the transmitter proceeds to step 1330 where it transmits new data. However, if the NACK is received in step 1302, the transmitter proceeds to step 1304 where it increases a count value k by 1 to count the number of the received NACKs. That is, the transmitter counts the number of transmission failures through the count value k. The transmitter determines in step 1306 whether the number of transmission failures by the count value k is larger than or equal to a threshold value α. As a result of the determination, if the number of transmission failures by the count value k is larger than or equal to the threshold value α, the transmitter attempts to change the modulation technique. The threshold value α is previously determined according to a channel condition. For example, if the threshold value α is defined as 1, the transmitter attempts to change the modulation technique at first retransmission after initial transmission is failed. However, if the number of transmission failures by the count value k is smaller than the threshold value α in step 1306, the transmitter proceeds to step 1326 where it sets the modulation technique for retransmission to the modulation technique for initial transmission ($M_r=M_i$). Thereafter, the transmitter transmits the retransmission data in step 1328.

In order to attempt to change the modulation technique, the transmitter compares, in step 1308, the number $N_r$ of orthogonal codes available for retransmission with the number $N_i$ of orthogonal codes available for initial transmission. That is, the transmitter determines in step 1308 whether the number $N_r$ of orthogonal codes available for retransmission is larger than or equal to the number $N_i$ of orthogonal codes available for initial transmission. If $N_r$ is larger than or equal to $N_i$, the transmitter proceeds to step 1310 and determines whether a current channel condition (or carrier-to-interference ratio (C/I)) is worse than the channel condition at initial transmission. If the current channel condition is worse than the channel condition at initial transmission, the transmitter sets, in step 1312, a modulation technique $m_r$ for retransmission to a modulation technique having a one-step lower modulation order. In step 1314, the transmitter compares $N_r$ with a value calculated by Equation (3) to which the $m_r$ is applied.

$$N_r \geq \left\lceil R \times \frac{m_i}{m_r} \times N_i \right\rceil \tag{3}$$

In Equation (3), $m_k=\log_2 M_k$, and $M_k$ indicates an integer of 4, 16 and 64 for QPSK, 16QAM and 64QAM, respectively. A value of the $N_r$ is a minimum value capable of increasing the decoding effect by transmitting all systematic bits of the packet through one retransmission. However, since the S packets can be fully transmitted through two or more retransmissions, this process can be excluded. This process is used to maximize the effect of the present invention. If the condition is satisfied in step 1314, the transmitter decreases, in step 1316, the modulation order by one step and then retransmits the packet. That is, if 16QAM was used at initial transmission, the modulation technique is changed to QPSK for partial packet transmission. However, if the channel condition is not worsened even though the number of orthogonal codes available for retransmission is increased, the transmitter proceeds to step 1326 where it sets the modulation technique for retransmission to the modulation technique for initial transmission. However, although the channel condition become worsened such that the modulation technique should be changed, if Equation (3) is not satisfied, it is impossible to transmit all systematic bits at first retransmission, so that the modulation technique for retransmission is set to the modulation technique for initial transmission. In addition, if the number of orthogonal codes available for retransmission is larger than or equal to the number of orthogonal codes available for initial transmission, it is not necessary to change the modulation technique to a high-order modulation technique. This is because the receiver has no difficulty in combining the entire packet since the transmitter can transmit the entire data packet by the current modulation technique.

On the contrary, reference will be made to when the number of orthogonal codes available for retransmission is decreased. If it is determined in step 1318 that the channel condition is not good so that the modulation technique should have a higher modulation order than a modulation order at the initial transmission, the transmitter uses the same modulation technique in step 1326. However, if the channel condition is good so that the above condition is satisfied, the transmitter proceeds to step 1320 where it sets the $m_r$ to the modulation technique having a one-step higher modulation order. Thereafter, the transmitter determines in step 1322 whether the $N_r$ satisfies Equation (3). If the number $N_r$ of orthogonal codes available for retransmission satisfies Equation (3), the transmitter proceeds to step 1324 where it transmits the packet by a modulation technique having a high-order modulation order. Here, $N_r$ is the minimum number of orthogonal codes needed to transmit all the S sub-packets through one retransmission. However, if the number of orthogonal codes available for retransmission is reduced, the transmitter proceeds to step 1326, so that the transmitter is not required to change the modulation technique to a modulation technique having a lower modulation order than a modulation order at initial transmission.

6. Modified Structure of Transmitter

So far, the embodiments of the present invention have been described with reference to the transmitter illustrated in FIG. 7 and the receiver illustrated in FIG. 8 in the system supporting the CC-type HARQ. However, in an environment where the number of orthogonal codes available for retransmission is changed, the present invention for changing a modulation technique for retransmission according to the channel environment and the number of available orthogonal codes, selecting the sub-packets with a higher priority according the changed modulation technique, and transmitting the selected sub-packets, can be realized in several ways. In addition, it is necessary to modify the structure of the transmitter and the receiver in order to apply the invention to the system supporting the IR-type HARQ.

As described above, the present invention provides a method for properly changing a modulation technique according to the channel condition and the number of available orthogonal codes changed during retransmission in the high-speed radio packet data communication system supporting the AMCS and the CC-type HARQ. When retransmitting only a part of the initially transmitted packet using the changed modulation technique, the present invention selectively transmits the sub-packets with higher priority to increase a reliability of LLR values of input bits to the turbo decoder, thereby decreasing the frame error rate compared with the existing system. In this manner, it is possible to remarkably increase transmission efficiency. The present invention can be applied to every transceiver for a wire/wireless communication system. In addition, the present invention, if applied to the HSDPA and 1×EV-DV proposed by 3GPP and 3GPP2, can improve the entire system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for retransmitting coded bits by a transmitter in response to a retransmission request from a receiver in a mobile communication system, which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code, the method comprising the steps of:

determining orthogonal codes available for retransmission;

separating the coded bits with higher priority and the coded bits with lower priority into a plurality of sub-packets with a given size, and selecting at least a portion of the sub-packets to be repeatedly transmitted, depending on the determined number of available orthogonal codes; and transmitting a stream of symbols obtained by symbol-mapping coded bits of the selected sub-packets by the specific modulation technique, with the determined available orthogonal codes.

2. The method of claim 1, wherein the at least the portion of the sub-packets to be repeatedly transmitted are selected depending on the determined number of available orthogonal codes and the specific modulation technique, if the specific modulation technique is different from a modulation technique used during initial transmission or previous retransmission.

3. The method of claim 1, wherein a number of sub-packets selected from the plurality of sub-packets is determined according to the number $D_r$ of coded bits calculated by $$D_r = \alpha \times \beta \times D_i,\ \alpha = \frac{\log_2 M_r}{\log_2 M_i} \text{ and } \beta = \frac{N_r}{N_i}$$

where $M_i$ indicates an integer corresponding to the modulation technique during initial transmission, and $M_r$ indicates an integer corresponding to a modulation technique at retransmission, $N_i$ indicates the number of codes available for initial transmission, $N_r$ indicates the number of codes available for retransmission, and $D_i$ denotes the number of coded bits transmitted during initial transmission.

4. The method of claim 3, wherein the specific modulation technique includes 64QAM (64-ary Quadrature Amplitude Modulation), 16QAM (16-ary Quadrature Amplitude Modulation), and QPSK (Quadrature Phase Shift Keying), and the integer $M_i$ or $M_r$ becomes 64 for 64QAM, 16 for 16QAM and 4 for QPSK.

5. The method of claim 1, wherein sub-packets comprised of the coded bits with higher priority are first selected in the step of selecting the sub-packets to be transmitted.

6. The method of claim 1, wherein previously non-transmitted sub-packets are first selected in the step of selecting the sub-packets to be transmitted.

7. An apparatus for retransmitting coded bits by a transmitter in response to a retransmission request from a receiver in a mobile communication system, which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code, the apparatus comprising:

a controller for determining orthogonal codes available for retransmission;

a selector for separating the coded bits with higher priority and the coded bits with lower priority into a plurality of sub-packets with a given size, and selecting at least a portion of the sub-packets to be repeatedly transmitted, depending on the determined number of available orthogonal codes;

a modulator for generating a stream of symbols by symbol mapping coded bits of the selected sub-packets by the specific modulation technique; and a frequency spreader for transmitting the stream of symbols using the determined available orthogonal codes.

8. The apparatus of claim 7, wherein the controller selects the at least the portion of the sub-packets or sub-packets to be repeatedly transmitted, depending on the determined number of available orthogonal codes and the specific modulation technique, if the specific modulation technique is different from a modulation technique used at initial transmission or previous retransmission.

9. The apparatus of claim 7, wherein a number of sub-packets selected from the plurality of sub-packets is determined according to the number $D_r$ of coded bits calculated by $$D_r = \alpha \times \beta \times D_i,\ \alpha = \frac{\log_2 M_r}{\log_2 M_i} \text{ and } \beta = \frac{N_r}{N_i}$$

where $M_i$ indicates an integer corresponding to the modulation technique at initial transmission, and $M_r$ indicates an integer corresponding to a modulation technique at retransmission, $N_i$ indicates the number of codes available for initial transmission, $N_r$ indicates the number of codes available for retransmission, and $D_i$ denotes the number of coded bits transmitted during initial transmission.

10. The apparatus of claim 9, wherein the specific modulation technique includes 64QAM (64-ary Quadrature Amplitude Modulation), 16QAM (16-ary Quadrature Amplitude Modulation), and QPSK (Quadrature Phase Shift Keying), and the integer $M_i$ or $M_r$ becomes 64 for 64QAM, 16 for 16QAM and 4 for QPSK.

11. The apparatus of claim 7, wherein the selector first selects sub-packets comprised of the coded bits with higher priority when selecting the sub-packets to be transmitted.

12. The apparatus of claim 7, wherein the selector first selects previously non-transmitted sub-packets when selecting the sub-packets to be transmitted.

13. A method for performing retransmission on initially transmitted coded bits by a transmitter in response to a retransmission request from a receiver in a CDMA (Code Division Multiple Access) mobile communication system including a channel encoder for encoding input data at a predetermined coding rate and outputting coded bits, the method comprising the steps of:

upon receiving a retransmission request from the receiver, determining a modulation technique and a number of available orthogonal codes, to be used at retransmission;

receiving coded bits from the channel encoder, and distributing the coded bits into systematic bits and parity bits;

receiving the systematic bits and the parity bits, and separately interleaving the received systematic bits and parity bits;

determining a number of coded bits to be transmitted depending on the determined modulation technique and the determined number of available orthogonal codes, to be used during retransmission, and selecting as many interleaved systematic bits and parity bits as the determined number of coded bits;

modulating the selected systematic bits and parity bits by the determined modulation technique, and outputting modulated symbols; and frequency-spreading the modulated symbols with corresponding orthogonal codes among the available orthogonal codes.

14. The method of claim 13, wherein the modulation technique to be used during retransmission is determined according to a channel environment at an instant when the retransmission request is received.

15. The method of claim 13, wherein the number Dr of coded bits to be transmitted is determined by $$D_r = \alpha \times \beta \times D_i,\ \alpha = \frac{\log_2 M_r}{\log_2 M_i} \text{ and } \beta = \frac{N_r}{N_i}$$

where $M_i$ indicates an integer corresponding to a modulation technique at initial transmission, and $M_r$ indicates an integer corresponding to a modulation technique at retransmission, $N_i$ indicates the number of codes available for initial transmission, $N_r$ indicates the number of codes available for retransmission, and $D_i$ denotes the number of coded bits transmitted during initial transmission.

16. The method of claim 15, wherein the specific modulation technique includes 64QAM (64-ary Quadrature Amplitude Modulation), 16QAM (16-ary Quadrature Amplitude Modulation) and QPSK (Quadrature Phase Shift Keying), and the integer $M_i$ or $M_r$ becomes 64 for 64QAM, 16 for 16QAM and 4 for QPSK.

17. The method of claim 13, wherein the interleaved systematic bits are first selected in the step of selecting as many interleaved systematic bits and parity bits as the determined number of coded bits.

18. The method of claim 13, wherein previously non-transmitted systematic bits and parity bits are first selected in the step of selecting as many interleaved systematic bits and parity bits as the determined number of coded bits.

19. An apparatus for performing retransmission on initially transmitted coded bits by a transmitter in response to a retransmission request from a receiver in a CDMA (Code Division Multiple Access) mobile communication system including a channel encoder for encoding input data at a predetermined coding rate and outputting coded bits, the apparatus comprising:

a controller for determining a modulation technique and a number of available orthogonal codes to be used at retransmission, upon receiving a retransmission request from the receiver;

a distributor for receiving coded bits from the channel encoder, and distributing the coded bits into systematic bits and parity bits;

an interleaver for receiving the systematic bits and the parity bits, and separately interleaving the systematic bits and the parity bits;

a selector for determining a number of coded bits to be transmitted depending on the determined modulation technique and the determined number of available orthogonal codes, and selecting as many interleaved systematic bits and parity bits as the determined number of coded bits;

a modulator for modulating the selected systematic bits and parity bits by the determined modulation technique, and outputting modulated symbols; and a frequency spreader for frequency-spreading the modulated symbols with corresponding orthogonal codes among the available orthogonal codes.

20. The apparatus of claim 19, wherein the controller determines the modulation technique to be used during retransmission according to a channel environment at an instant when the retransmission request is received.

21. The apparatus of claim 19, wherein the number $D_r$ of coded bits to be transmitted is determined by $$D_r = \alpha \times \beta \times D_i,\ \alpha = \frac{\log_2 M_r}{\log_2 M_i} \text{ and } \beta = \frac{N_r}{N_i}$$

where $M_i$ indicates an integer corresponding to a modulation technique at initial transmission, and $M_r$ indicates an integer corresponding to a modulation technique at retransmission, $N_i$ indicates the number of codes available for initial transmission, $N_r$ indicates the number of codes available for retransmission, and $D_i$ denotes the number of coded bits transmitted during initial transmission.

22. The apparatus of claim 21, wherein the specific modulation technique includes 64QAM (64-ary Quadrature Amplitude Modulation), 16QAM (16-ary Quadrature Amplitude Modulation) and QPSK (Quadrature Phase Shift Keying), and the integer $M_i$ or $M_r$ becomes 64 for 64QAM, 16 for 16QAM and 4 for QPSK.

23. The apparatus of claim 19, wherein the selector first selects the interleaved systematic bits when selecting as many interleaved systematic bits and parity bits as the determined number of coded bits.

24. The apparatus of claim 19, wherein the selector first selects previously non-transmitted systematic bits and parity bits when selecting as many interleaved systematic bits and parity bits as the determined number of coded bits.

25. A method for receiving by a receiver data retransmitted from a transmitter in a mobile communication system, which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code, the method comprising the steps of:

determining orthogonal codes available for retransmission;

despreading the received data with the determined available orthogonal codes and outputting a stream of modulated symbols;

demodulating the stream of modulated symbols by a demodulation technique corresponding to the specific modulation technique, and outputting coded bits;

separating the coded bits into the coded bits with higher priority and the coded bits with lower priority, and combining the separated coded bits with at least one of previously received coded bits; and separately deinterleaving the combined coded bits with higher priority and the combined coded bits with lower priority, and channel-decoding the deinterleaved coded bits.

26. An apparatus for receiving by a receiver data retransmitted from a transmitter in a mobile communication system which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code, the apparatus comprising:

a despreader for despreading the received data with as many available orthogonal codes as a number of available orthogonal codes used during retransmission, and outputting a stream of modulated symbols;

a demodulator for demodulating the stream of modulated symbols by a demodulation technique corresponding to the specific modulation technique;

a selective packet combiner for separating the coded bits into the coded bits with higher priority and the coded bits with lower priority, and combining the separated coded bits with at least one of the previously received coded bits;

a deinterleaver for separately deinterleaving the combined coded bits with higher priority and the combined coded bits with lower priority; and a channel decoder for channel-decoding the deinterleaved coded bits with higher priority and the deinterleaved coded bits with lower priority.

27. A method for retransmitting coded bits by a transmitter in response to a retransmission request from a receiver in a mobile communication system, which separates coded bits output from an encoder at a given coding rate into coded bits with higher priority and coded bits with lower priority, and transmits from the transmitter to the receiver a stream of symbols obtained by symbol mapping the coded bits with higher priority and the coded bits with lower priority by a specific modulation technique, with at least one available orthogonal code, the method comprising the steps of:

upon receiving a retransmission request in response to a predetermined number of retransmission attempts, determining a modulation technique with a one-step lower modulation order than a modulation technique $M_i$ at initial transmission as a modulation technique $M_r$ to be used during retransmission, if the number $N_r$ of orthogonal codes available for retransmission is larger than or equal to the number $N_i$ of orthogonal codes available for initial transmission, and a channel condition at retransmission is worse than a channel condition at retransmission;

determining a modulation technique with a one-step higher modulation order than the modulation order $M_i$ at initial transmission as a modulation technique $M_r$ to be used during retransmission, if the number $N_r$ of orthogonal codes available for retransmission is smaller than the number $N_i$ of orthogonal codes available for initial transmission and a channel condition at retransmission is better than a channel condition at retransmission;

determining whether the number $N_r$ of orthogonal codes available for retransmission is proper by applying the determined modulation technique $M_r$ to the following equation, $$N_r \geq \left\lceil R \times \frac{m_i}{m_r} \times N_i \right\rceil$$

where $m_k = \log_2 M_k$, $m_i = \log_2 M_i$, and R is an integer; and modulating at least one of the coded bits by the determined modulation technique $M_r$ and retransmitting the modulated coded bits, if the number $N_r$ of orthogonal codes available for retransmission is proper.

* * * * *